(12) United States Patent
Heldmann et al.

(10) Patent No.: US 7,078,455 B2
(45) Date of Patent: Jul. 18, 2006

(54) AQUEOUS PLASTIC MATERIAL DISPERSIONS METHOD FOR PRODUCING THE SAME AND USE THEREOF

(75) Inventors: Carsten Heldmann, Mainz (DE); Harald Petri, Aarbergen (DE); Thomas Wirth, Hainburg (DE)

(73) Assignee: Celanese Emulsions GmbH (DE)

( * ) Notice: Subject to any disclaimer, the term of this patent is extended or adjusted under 35 U.S.C. 154(b) by 277 days.

(21) Appl. No.: 10/472,110

(22) PCT Filed: Mar. 14, 2002

(86) PCT No.: PCT/EP02/02817

§ 371 (c)(1),
(2), (4) Date: Oct. 6, 2003

(87) PCT Pub. No.: WO02/074856

PCT Pub. Date: Sep. 26, 2002

(65) Prior Publication Data

US 2004/0077782 A1 Apr. 22, 2004

(30) Foreign Application Priority Data

Mar. 15, 2001 (DE) .................. 101 12 431

(51) Int. Cl.
*C09D 131/02* (2006.01)
*C09D 5/02* (2006.01)
*C08J 3/02* (2006.01)

(52) U.S. Cl. .................. 524/524; 523/201; 524/458; 525/902; 526/201

(58) Field of Classification Search ............... 523/201; 524/458, 524; 525/902; 526/201
See application file for complete search history.

(56) References Cited

U.S. PATENT DOCUMENTS

| 3,644,262 A | | 2/1972 | Stehle et al. | |
|---|---|---|---|---|
| 5,614,049 A | | 3/1997 | Kohlhammer et al. | |
| 5,907,011 A | * | 5/1999 | Jakob et al. | ................ 524/524 |

FOREIGN PATENT DOCUMENTS

| CA | 2114246 A | * | 7/1994 |
|---|---|---|---|
| DE | 4431343 | | 3/1996 |
| DE | 19739936 | | 3/1999 |
| DE | 19811314 | | 9/1999 |
| DE | 19853461 | | 5/2000 |
| DE | 10112431 | | 10/2002 |
| EP | 256391 | | 2/1988 |
| EP | 0347760 | | 12/1989 |
| EP | 444827 | | 9/1991 |
| EP | 0609756 | | 8/1994 |
| EP | 1018535 | | 7/2000 |

OTHER PUBLICATIONS

Tongyu et al, Study . . . Temperatures, Journal of Applied Polymer Science, vol. 41, 1965-1972 (1990).
Jonsson et al, "Polymerization . . . Monomer", Macromolecules, vol. 27, No. 7, 1994, pp. 1932-1937.

* cited by examiner

*Primary Examiner*—Kelechi C. Egwim
(74) *Attorney, Agent, or Firm*—Charles A. Muserlian

(57) ABSTRACT

The present invention relates to aqueous plastic material dispersions based on vinyl ester copolymers, having a solids content of up to 80% by weight and a minimum film formation temperature below 20° C., which is substantially stabilized by ionic components, the vinyl ester copolymers containing at least one homo- or copolymer A and at least one homo- or copolymer B, methods for producing the same and the use thereof.

28 Claims, No Drawings

AQUEOUS PLASTIC MATERIAL DISPERSIONS METHOD FOR PRODUCING THE SAME AND USE THEREOF

This application is a 371 of PCT/EP02/02817 filed Mar. 14, 2002.

The present invention relates to aqueous plastic material dispersions based on vinyl ester copolymers which are substantially stabilized by ionic components, methods for producing the same and the use thereof.

Plastic material dispersions are used as binders for the preparation of both pigmented and unpigmented, aqueous formulations which are used, for example, as coating materials. The pigmented coating materials include in particular glazes, emulsion finishes, emulsion paints, synthetic resin-bound renders, sealing compounds and filling compounds, which are widely used both in the protection of buildings and in the decorative sector. The unpigmented coating materials include, for example, clear finishes. Moreover, plastic material dispersions are the main component of water-based food coatings which are intended to protect the substrate from drying out and harmful environmental influences.

Said coating materials can be divided into two classes depending on the proportion of plastic material dispersions in the total coating composition. Glazes, emulsion finishes and gloss paints can be assigned to the class consisting of the subcritically formulated coating compositions, which have a pigment volume concentration (PVC) below the so-called critical PVC. On the other hand there are supercritical, pigment-containing coating materials, such as, for example, interior paints or synthetic resin-bound renders having a high filler content. These have a pigment volume concentration above the critical pigment volume concentration and are formulated with a substantially lower content of polymeric binder. These two classes of coating composition must meet a multiplicity of practical requirements. Common to both classes is that, in addition to good processibility of the aqueous formulations even at low processing temperatures, blocking resistance of the dried coating and resistance of the coatings to abrasion are among the most important performance characteristics.

In the case of binder-rich coating compositions (low PVC) whose surfaces are characterized by a high content of polymeric binder, gloss properties of the dried coating are also of primary importance apart from the blocking resistance and abrasion resistance.

Conventional coating materials based on aqueous plastic material dispersions meet these requirements with regard to binder-rich coating compositions if, as a rule, a polymer having a relatively high glass transition temperature (relatively hard polymer) is used as a binder and small amounts of film formation auxiliaries, such as, for example, organic solvents (e.g. hydrocarbons) and/or plasticizers (e.g. phthalic esters or glycol ethers) are added in order to reduce the minimum film formation temperature (MFT), i.e. the temperature above which the polymer in the formulation is converted into a film, and to ensure film formation of the polymer even at relatively low processing temperatures. Solvents and volatile plasticizers are liberated on drying the formulation, with the result that the mechanical strength of the coating is increased or the surface hardness and hence the blocking resistance of the paint formulation increase. However, owing to their harmful effect on man and the environment, the abrasion of volatile organic component is not desired, particularly in applications indoors.

There therefore was and is a considerable need for aqueous plastic material dispersions which make it possible to formulate plasticizer- and solvent-free coating systems having high binder contents (low PVC) and a low film formation temperature, which meet the requirements with regard to blocking resistance, gloss properties and abrasion properties.

In contrast to the required performance characteristics of binder-rich coating systems, in the case of so-called high-filler coating systems which are formulated with a low binder content (high PVC), sufficient blocking resistance is usually present at the coating surface owing to the high proportion of fillers and pigments. Instead, in particular the resistance of the dried coatings to abrasion (abrasion resistance) is of primary importance as a performance characteristic for these coating systems.

As in the case of conventional, binder-rich coating materials, the required properties are achieved in the case of conventional high-filler coating materials by using a polymer having a relatively high glass transition temperature (relatively hard polymer) as a binder together with small amounts of a film formation auxiliary, which however is once again released into the environment on drying of the formulation.

In combination with film formation auxiliaries, polymers having a relatively high glass transition temperature thus serve as universal binders for the preparation of conventional coating materials having high and low PVCs, which can be processed at low temperatures.

In view of this universal applicability of conventional binder systems, there was and is, over and above the need for aqueous plastic material dispersions which make it possible to formulate plasticizer- and formulation-free coating systems having low PVCs and a low film formation temperature, which meet the requirements with regard to blocking resistance, gloss properties and abrasion properties, also a considerable need for universally applicable, aqueous plastic material dispersions which make it possible to formulate plasticizer- and solvent-free coating systems both having high and having low PVCs and a low film formation temperature, which meet the requirements with regard to blocking resistance, gloss properties and abrasion resistance.

DE-A-198 11 314 discloses multistage acrylic ester dispersions which contain itaconic acid as an acidic comonomer and are preferably prepared using anionic emulsifiers or using mixtures of anionic and nonionic emulsifiers as stabilizers. The binders described have advantageous wet abrasion resistances and blocking resistances, but only in plasticizer-containing paint formulations having a low PVC of 46.9%.

EP-A-0 347 760 leaves a special sulfosuccinamide salt as a subsequent additive and/or a stabilizer during the polymerization of acrylic ester and styrene/acrylic ester dispersions is recommended. With the binders thus obtained, plasticizer-containing gloss finishes having high blocking resistance can be produced. On the other hand, all other ionic emulsifiers investigated have no effect.

EP-A-0 609 756 discloses multistage acrylic ester, styrene/acrylic ester and vinyl/acrylic ester dispersions, it being necessary for one of the polymer phases to have a glass transition temperature in the range from −55 to −5° C. and a further polymer phase to have a glass transition temperature in the range from 0 to 50° C. For the preparation of these dispersions, at least one anionic emulsifier and optionally at least one nonionic emulsifier are preferably used. In the examples, stabilizer systems consisting of nonionic and ionic emulsifiers in the ratio of about 1:1 are disclosed. They show that the solvent-free semi-gloss, satin and silk paint examples formulated using the binders according to the invention have blocking resistances which are comparable with the solvent-containing systems, which is achieved by the presence of two polymer phases having the special glass transition temperature ranges.

EP-A-1 018 835 describes solvent-free coating compositions having improved blocking resistance, which contain, as a binder, a mixture of an acrylic ester copolymer dispersion and a vinyl ester copolymer dispersion. Characteristic of the acrylic ester component used in less than the required amount in the dispersion mixture is not only the necessary copolymerization of sterically hindered silanes but also the use of at least one anionic emulsifier during the preparation of this dispersion component for achieving the desired high blocking resistances of the coating compositions prepared using these binders. According to the teaching of this publication, the exclusive use of nonionic surfactants in the preparation of the acrylic ester component leads to insufficient blocking resistances. In contrast, the nature of the emulsifier which is used in the preparation of the vinyl ester component employed in excess has no effect on the blocking resistance of the resulting coatings.

Vinyl ester dispersions having heterogeneous morphology are described in a number of patent applications.

Thus, DE-A-198 53 461 discloses protective colloid-stabilized copolymer latex particles having heterogeneous morphology, which are composed of a hard and a soft polymer phase, the preferred glass transition temperatures of the individual phases being from −40 to +20° C. and from +20 to +35° C., respectively. The emulsion polymerization for the preparation of these dispersions, from which dispersion powders are prepared after they have been dried, stipulates the use of protective colloids. Surface-active substances, such as, for example, emulsifiers, can optionally be used. Also disclosed is the use of the copolymer latex particles as a binder in emulsion paints and renders.

DE-A-197 39 936 discloses plasticizer-free, heterogeneous vinyl acetate/ethene dispersions which are substantially stabilized with polyvinyl alcohol as protective colloid and are prepared by seed polymerization of a copolymer A having a glass transition temperature of >20°C. in the presence of a seed base comprising a copolymer B having a glass transition temperature of <20° C.

The dispersions described above in DE-A-198 53 461 and DE-A-197 39 936 are substantially stabilized by protective colloids. Owing to the associated high content of water-soluble, readily swellable, polymeric stabilizers, coating compositions which contain these dispersions of the binder are expected to have a high water absorption of the coating which leads to a low abrasion resistance under abrasive load in the swollen state.

EP-A-0 444 827 describes vinyl ester/ethene/acrylic ester dispersions having a core-shell morphology, the composition of the polymer phases of core and shell being chosen so that the copolymer has only a glass transition temperature in the range from −30 to 0° C. By means of the vinylsilane copolymerization also prescribed, dispersions which are suitable as advantageous binders for crack-bridging coating materials are obtained. The low glass transition temperature of the core-shell copolymer does however rule out the use of these soft copolymer dispersions as binders for the formulation of blocking-resistant, binder-rich coating compositions.

It was therefore an object of the present invention to overcome the disadvantages of the known, heterogeneous vinyl ester dispersions, in particular the insufficient blocking resistance of the binder-rich coating compositions formulated using these dispersions, and to provide novel vinyl ester dispersions which make it possible to provide plasticizer- and solvent-free coating compositions having a high binder content (e.g. coating compositions having a PVC lower than the critical PVC), which form crack-free coating films at low temperatures and are distinguished by improved blocking resistance.

Surprisingly, it was found that, contrary to the information from the prior art, the composition of the stabilizing system of vinyl ester dispersions has a substantial effect on the blocking resistance of coatings which are based on these binders. Accordingly, the object of the present invention is achieved by providing heterogeneous plastic material dispersions based on vinyl ester copolymers, which are substantially stabilized by ionic components.

The present invention therefore relates to an aqueous plastic material dispersion based on a vinyl ester copolymer P, having a solids content of up to 80% by weight and a minimum film formation temperature below 20° C., which is substantially stabilized by ionic components, the vinyl ester copolymer P comprising at least one homo- or copolymer A and at least one homo- or copolymer B, preferably at least one copolymer A and at least one copolymer B, particularly preferably a copolymer A and a copolymer B, and the homo- or copolymer A having a glass transition temperature in the range from 0 to 20° C. and the homo- or copolymer B having a glass transition temperature in the range from 20 to 50° C., provided that the glass transition temperatures of the two homo- or copolymers A and B differ by at least 10 K, the sum of the amounts of the homo- or copolymers A and B in the vinyl ester copolymer P being at least 50% by weight, based on the copolymer P, the weight ratio of homo- or copolymer A to homo- or copolymer B being in the range from 95/5 to 5/95 and the homo- or copolymers A and B, independently of one another, containing in the form of copolymerized units (a) from 50 to 100% by weight of at least one vinyl ester of carboxylic acids having 1 to 18 C atoms (M1) and (b) from 0 to 25% by weight of at least one monoethylenically unsaturated, optionally halogen-substituted hydrocarbon having 2 to 4 C atoms (M2), also referred to below as monoolefin having 2 to 4 C atoms, based on the total mass of the monomers used for the preparation of the respective homo- or copolymer A and B, which is characterized in that it comprises, based on the total mass of the monomers used for the preparation of the vinyl ester copolymer P, from 0 to 10% by weight of at least one ethylenically unsaturated, ionic monomer (M3) and from 0 to 5% by weight of ionic emulsifiers (S1), the total mass of ethylenically unsaturated, ionic monomers (M3) and ionic emulsifiers (S1) being at least 2% by weight.

The term solids content is understood in the present application as meaning the total mass of copolymer, based on the total mass of the dispersion. The solids content of the plastic material dispersions according to the invention is preferably in the range from 20 to 80% by weight, particularly preferably in the range from 40 to 70% by weight and in particular in the range from 45 to 60% by weight.

The sum of the amounts of homo- or copolymers A and B in the vinyl ester copolymer P is preferably from 75 to 100% by weight, particularly preferably from 80 to 100% by weight and in particular from 85 to 100% by weight, based on the total mass of the copolymer P.

The weight ratio of homo- or copolymer A to homo- or copolymer B is preferably in the range from 90/10 to 10/90, particularly preferably in the range from 80/20 to 20/80 and in particular in the range from 70/30 to 30/70.

The size of the homo- or copolymer particles of the dispersions according to the invention may vary within wide ranges. However, the mean particle diameter preferably should not exceed 1 000 nm and particularly preferably should not exceed 600 nm. With regard to optimum coating properties, the average particle diameter should in particular be less than 350 nm. In the case of binder dispersions having high solids contents of more than 60% by weight, based on the total weight of the binder dispersions, it is however particularly preferred, for reasons relating to the viscosity, if the mean particle diameter is greater than 140 nm.

The plastic material dispersions according to the invention preferably have a pH which is in the range from 2 to 9 and particularly preferably in the range from 3 to 7.

The minimum film formation temperature of the heterogeneous vinyl ester dispersions according to the invention are 20° C. Preferably, the minimum film formation is below 10° C., particularly preferably below 5° C. and in particular below 0° C.

In a preferred embodiment of the present invention, the vinyl ester copolymer particles of the dispersions according to the invention are, in the widest sense, multistage polymers having at least one soft polymer phase (i.e. low Tg) and at least one hard polymer phase (i.e. high Tg), which can be prepared, for example, by multistage emulsion polymerization, the polymerization of the subsequent stage(s) being effected in the presence of the previously formed polymerization stage(s). Particularly preferably, the multistage polymerization processes by means of which the plastic material dispersions according to the invention can be prepared are two-stage processes.

In addition, the vinyl ester copolymers P of the plastic material dispersions according to the invention can, however, also be obtained by mixing at least two homo- or copolymers A and B prepared beforehand separately in dispersion form.

In the present application, the glass transition temperatures of the homo- or copolymers A and B are calculated according to a Fox equation (T. G. Fox, Bull. Am. Phys. Soc. (Ser. II) 1, 123 [1956] and Ullmann's Enzyklopädie der technischen Chemie [Ullmann's Encyclopedia of Industrial Chemistry], Weinheim (1980), Volume 19, pages 17–18), according to which a good approximation for the glass transition temperature Tg of copolymers having high molar masses is the equation $$\frac{1}{T_g} = \frac{X^1}{T_g^1} + \frac{X^2}{T_g^2} + \cdots \frac{X^n}{T_g^n}$$

in which $X^1, X^2, \ldots, X^n$ are the mass fractions $1, 2, \ldots, n$ and $T_g^1, T_g^2, \ldots, T_g^n$ are the glass transition temperatures, in degrees Kelvin, of the polymer composed in each case only of one of the monomers $1, 2, \ldots, n$. The latter are known, for example, from Ullmann's Enzyklopädia of Industrial Chemistry, V C H Weinheim, Vol. A 21 (1992), page 169, or from Brandrup, E. H. Immergut, Polymer Handbook $3^{rd}$ ed, J. Wiley, New York 1989, such as, for example, the glass transition temperature 148 K of the ethene homopolymer (cf. Brandrup, E. H. Immergut, Polymer Handbook $3^{rd}$ ed, J. Wiley, New York 1989, page VI/214) and the glass transition temperature of 315 K for the vinyl acetate homopolymer (cf. Ullmann's Enzyklopädia of Industrial Chemistry, V C H Weinheim, Vol. A 21 (1992), page 169). In the course of simplified calculation of the glass transition temperatures, it is possible to take into account only the main monomers (M1) and (M2) contributing to the formation of the phases and to neglect the contributions of further monomers which result from mass fractions of less than 2% by weight, as long as the sum of the mass fractions of these monomers does not exceed 4% by weight.

All monomers known to a person skilled in the art can be used as vinyl esters of carboxylic acids having 1 to 18 carbon atoms (M1). Vinyl esters of carboxylic acids having 1 to 8 carbon atoms are preferred, such as, for example, vinyl formate, vinyl acetate, vinyl propionate, vinyl isobutyrate, vinyl pivalate and vinyl 2-ethyhexylhexanoate; vinyl esters of saturated, branched monocarboxylic acids having 9, 10 or 11 carbon atoms in the acid radical (®Versatic acids); vinyl esters of long-chain saturated and unsaturated fatty acids, such as, for example, vinyl laurate and vinyl stearate; vinyl esters of benzoic acid or of p-tert-butylbenzoic acid and mixtures thereof. However, vinyl esters of carboxylic acids having 1 to 4 carbon atoms, mixtures of vinyl acetate and at least one versatic acid and mixtures of vinyl acetate and vinyl laurate are particularly preferred. Vinyl acetate is particularly preferred.

Examples of monoethylenically unsaturated, optionally halogen-substituted hydrocarbons having 2 to 4 carbon atoms (M2), also referred to below as monoolefins having 2 to 4 carbon atoms, are ethene, propene, 1-butene, 2-butene, isobutene, vinyl chloride and vinylidene chloride, ethene and mixtures of ethene and vinyl chloride being preferred. The amount of these monomers (M2) in the vinyl ester copolymer P is preferably less than 20% by weight, based on the total mass of the monomers used for the preparation of the vinyl ester copolymer P.

Preferred monomer mixtures comprising the monomers M1 and M2 for the preparation of the copolymers A and B according to the invention are vinyl acetate/vinyl chloride/ethene, vinyl acetate/vinyl laurate/ethene, vinyl acetate/vinyl laurate/ethene/vinyl chloride, vinyl acetate/vinyl versatate/ethene/vinyl chloride, vinyl versatate/ethene/vinyl chloride, vinyl acetate/vinyl versatate/ethene and vinyl acetate/ethene, the combination vinyl acetate/ethene being particularly preferred.

In the present application, ethylenically unsaturated, ionic monomers (M3) are preferably those ethylenically unsaturated monomers which have a water solubility of more than 50 g/l, preferably more than 80 g/l, at 25° C. and 1 bar and which, in dilute aqueous solution at pH 2 and/or pH 11, are present in a proportion of more than 50%, preferably more than 80%, as an ionic compound or, at pH 2 and/or pH 11, are transformed into an extent of more than 50%, preferably more than 80%, into an ionic compound by protonation or deprotonation.

Suitable ethylenically unsaturated, ionic monomers (M3) are those compounds which carry at least one carboxylic acid, one sulfonic acid, one phosphoric acid or one phosphonic acid group directly neighboring the double bond unit or a link to this via a spacer. The following may be mentioned as examples: α,β-unsaturated $C_3$–$C_8$-monocarboxylic acids, α,β-unsaturated $C_5$–$C_8$-dicarboxylic acids and the anhydrides thereof, and monoesters of α,β-unsaturated $C_4$–$C_8$-dicarboxylic acids.

Unsaturated monocarboxylic acids, such as, for example, acrylic acid and (meth)acrylic acid, and the anhydrides thereof; unsaturated dicarboxylic acids, such as, for example, maleic acid, fumaric acid, itaconic acid and citraconic acid and the monoesters thereof with $C_1$–$C_{12}$-alkanols, such as monomethyl maleate and mono-n-butyl maleate, are preferred. Further preferred, ethylenically unsaturated, ionic monomers (M3) are ethylenically unsaturated sulfonic acids, such as, for example, vinylsulfonic acid, 2-acrylamido-2-methylpropanesulfonic acid, 2-acryloyloxy and 2-methacryloyloxyethanesulfonic acid, 2-acryloyloxy- and 3-methacryloyloxypropanesulfonic acid and vinylbenzenesulfonic acid, and ethylenically unsaturated phosphonic acids, such as, for example, vinylphosphonic acid.

Moreover, in addition to said acids, salts thereof may also be used, preferably the alkali metal salts thereof or the ammonium salts thereof and in particular the sodium salts thereof, such as, for example, sodium salts of vinylsulfonic acid and of 2-acrylamidopropanesulfonic acid.

Said ethylenically unsaturated, free acids are present in aqueous solution at pH 11 predominantly in the form of their conjugated bases in anionic form and, like said salts, can be referred to as anionic monomers.

Other suitable ethylenically unsaturated, ionic monomers (M3) are monomers having a cationic functionality, such as, for example, monomers derived from quaternary ammonium groups. However, anionic monomers are preferred.

A further object of the present invention was to overcome the disadvantages of the known, heterogeneous vinyl ester dispersions, in particular the insufficient blocking resistance of binder-rich coating compositions formulated with these dispersions (e.g. coating compositions having a PVC of less than the critical PVC), as well as the insufficient abrasion resistance of coating compositions formulated with these dispersions, having a low binder content and having high pigment/filler contents (e.g. coating compositions having a PVC greater than the critical PVC), and to provide novel universally applicable vinyl ester dispersions which are suitable both for the preparation of binder-rich coating systems having improved blocking resistance and for the preparation of coating compositions having a low binder content and high pigment/filler contents, which have improved abrasion resistance.

This object is achieved if the vinyl ester copolymer P of the plastic material dispersions according to the invention additionally contains, incorporated as copolymerized- units, up to 5% by weight, preferably from 0.05 to 2% by weight and particularly preferably from 0.1 to 1.5% by weight, based on the total mass of the monomer used for the preparation of the vinyl ester copolymer P, of at least one unsaturated, copolymerizable organosilicon compound (M4), also referred to below as silane compound.

Examples of said organosilicon compounds are monomers of the general formula $RSi(CH_3)_{0-2}(OR^1)_{3-1}$, in which R has the meaning $CH_2=CR^2-(CH_2)_{0-1}$ or $CH_2=CR^2CO_2-(CH_2)_{1-3}$, $R^1$ is a straight-chain or branched, unsubstituted or substituted alkyl radical having 3 to 12 C atoms, which may optionally be interrupted by an ether group, and $R^2$ is H or $CH_3$.

Organosilicon compounds of the formulae $CH_2=CR^2-(CH_2)_{0-1}Si\ (CH_3)_{0-1}(OR^1)_{3-2}$ and $CH_2=CR^2-CO_2-(CH_2)_3\ Si\ (CH_3)_{0-1}(OR^1)_{3-2}$, in which $R^1$ is a branched or straight-chain alkyl radical having 1 to 8 C atoms and $R^2$ is H or $CH_3$, are preferred.

Particularly preferred organosilicon compounds are vinylmethyldimethoxysilane, vinylmethyldiethoxysilane, vinylmethyldi-n-propoxysilane, vinylmethyldiisopropoxy-silane, vinylmethyldi-n-butoxysilane, vinylmethyldi-sec-butoxysilane, vinylmethyldi-tert-butoxysilane, vinylmethyldi(2-methoxyisopropoxy)silane and vinylmethyldioctyloxysilane.

Organosilicon compounds of the formula $CH_2=CR^2-(CH_2)_{0-1}Si(OR^1)_3$ and $CH_2=CR^2-CO_2-(CH_2)_3Si(OR^1)_3$, in which $R^1$ is a branched or straight-chain alkyl radical having 1 to 4 C atoms and $R^2$ is H or $CH_3$, are particularly preferred. Examples of these are γ-(meth)acryloyloxypropyltris(2-methoxyethoxy)silane, γ-(meth)acryloyloxypropyltrismethoxysilane, γ-(meth)acryl-oyloxypropyltrisethoxysilane, γ-(meth)acryloyloxypropyl-tris-n-propoxysilane, γ-(meth)acryloyloxypropyltris-isopropoxysilane, γ-(meth)acryloyloxypropyltrisbutoxy-silane, γ-acryloyloxypropyltris(2-methoxyethoxy)silane, γ-acryloyloxypropyltrismethoxysilane, γ-acryloyloxy-propyltrisethoxysilane, γ-acryloyloxypropyltris-n-propoxysilane, γ-acryloyloxypropyltrisisopropoxysilane, γ-acryloyloxypropyltrisbutoxysilane and vinyltris(2-methoxyethoxy)silane, vinyltrismethoxysilane, vinyl-trisethoxysilane, vinyltris-n-propoxysilane, vinyltris-isopropoxysilane and vinyltrisbutoxysilane. Said organosilicon compounds can optionally also be used in the form of their (partial) hydrolysis products.

Furthermore, the vinyl ester copolymer P may contain, incorporated into the copolymerized units, up to 5% by weight of ethylenically unsaturated, nonionic monomers (M5), based on the total mass of the monomers used for the preparation of the vinyl ester copolymer P. The amount of these monomers (M5) is, however, preferably less than 2% by weight and particularly preferably less than 1% by weight.

In the present application, ethylenically unsaturated, nonionic monomers (M5) are preferably understood as meaning those ethylenically unsaturated compounds which have a water solubility of more than 50 g/l, preferably more than 80 g/l, at 25° C. and 1 bar and which are present in dilute aqueous solution at pH 2 and pH 11 predominantly in nonionic form.

Preferred ethylenically unsaturated, nonionic monomers (M5) are both the amides of carboxylic acids mentioned in connection with the ethylenically unsaturated, ionic monomers (M3), such as, for example, (meth)acrylamide and acrylamide, and water-soluble N-vinyllactams, such as, for example, N-vinylpyrrolidone, and those compounds which contain covalently bonded polyethylene glycol units as ethylenically unsaturated compounds, such as, for example, polyethylene glycol mono- or diallyl ether and the esters of ethylenically unsaturated carboxylic acids with polyalkylene glycols.

Moreover, the vinyl esters of copolymer P may contain, incorporated as copolymerized units, up to 30% by weight, preferably up to 15% by weight and particularly preferably up to 10% by weight, of at least one further, ethylenically unsaturated monomer (M6), based on the total mass of the monomers used for the preparation of the vinyl ester copolymer P.

Preferred further, ethylenically unsaturated monomers (M6) are in particular the esters of ethylenically unsaturated $C_3$–$C_8$-mono- and dicarboxylic acids with $C_1$–$C_8$-, preferably $C_1$–$C_{12}$- and particularly preferably $C_1$–$C_8$-alkanols or $C_5$–$C_8$-cycloalkanols. Suitable $C_1$–$C_{18}$-alkanols are, for example, methanol, ethanol, n-propanol, isopropanol, 1-butanol, 2-butanol, isobutanol tert-butanol, n-hexanol, 2-ethylhexanol, lauryl alcohol and stearyl alcohol. Suitable cycloalkanols are, for example, cyclopentanol and cyclohexanol. The esters of acrylic acid, of (meth)acrylic acid, of crotonic acid, of maleic acid, of itaconic acid, of citraconic acid and of fumaric acid are particularly preferred. The esters of acrylic acid and/or of (meth)acrylic acid, such as, for example, methyl (meth)acrylate, ethyl (meth)acrylate, isopropyl (meth)acrylate, n-butyl (meth)acrylate, isobutyl (meth)acrylate, 1-hexyl (meth)acrylate, tert-butyl (meth) acrylate and 2-ethylhexyl (meth)acrylate, and the esters of fumaric acid and of maleic acid, such as, for example, dimethyl fumarate, dimethyl maleate, di-n-butyl maleate, di-n-octyl maleate and 2-ethylhexyl maleate, are particularly preferred. Said esters may also be unsubstituted or substituted by epoxy and/or hydroxyl groups. Moreover, suitable further ethylenically unsaturated monomers (M6) are nitriles of $\alpha,\beta$-monoethylenically unsaturated $C_3$–$C_8$-carboxylic acids, such as, for example, acrylonitrile and (meth)acrylonitrile. Conjugated $C_4$–$C_8$-dienes, such as, for example, 1,3-butadiene, isoprene and chloroprene, can also be used as monomers (M6).

A partial substitution of the vinyl ester by said compounds is carried out as a rule in order to establish the properties of the homo- or copolymers A and/or B, such as, for example, the hydrophobic/hydrophilic properties.

Furthermore, those compounds which are known to improve the adhesion properties and/or to act as crosslinking agents can also be used as further, ethylenically unsaturated monomers (M6).

The adhesion-improving monomers include both compounds which have an acetoacetoxy unit covalently bonded to the double bond system and compounds having covalently bonded urea groups. The first-mentioned compounds include in particular acetoacetoxyethyl (meth)acrylate and allyl acetoacetate. The compounds containing urea groups include, for example, N-vinyl- and N-allylurea and derivatives of imidazolidin-2-one, such as, for example, N-vinyl- and N-allylimidazolid-2-one, N-vinyloxyethylimidazolidin-2-one, N-(2-(meth)acrylamidoethyl)imidazolidin-2-one, N-(2-methacryloyloxyethyl)imidazolidin-2-one and N-(2-(meth)acryloyloxyacetamidoethyl)imidazolidin-2-one, and further adhesion promoters known to a person skilled in the art and based on urea or imidazolidin-2-one. Diacetoneacrylamide in combination with a subsequent addition of adipic dihydrazide to the dispersion is also suitable for improving the adhesion. The adhesion-promoting monomers can, if required, be used in amounts of 0.1 to 10% by weight, preferably from 0.5 to 5% by weight, based on the total amount of the monomers used for the preparation of the vinyl ester copolymer P. In a preferred embodiment, however, the homo- or copolymers A and B contain none of these adhesion-promoting monomers incorporated as copolymerized units.

Both bifunctional and polyfunctional monomers can be used as crosslinking monomers. Examples of these are diallyl phthalate, diallyl maleate, triallyl cyanurate, tetraallyloxyethane, divinylbenzene, butane-1,4-diol di(meth)acrylate, triethylene glycol di(meth)acrylate, divinyl adipate, allyl (meth)acrylate, vinyl crotonate, methylenebisacrylamide, hexanediol diacrylate, pentaerythritol diacrylate and trimethylolpropane triacrylate. The crosslinking monomers can, if required, be used in amounts of from 0.02 to 5% by weight, preferably from 0.02 to 1% by weight, based on the total mass of the monomers used for the preparation of the vinyl ester copolymer P. In a preferred embodiment, however, the homo- or copolymers A and B contain none of these crosslinking monomers incorporated with copolymerized units.

In addition to the vinyl ester copolymer P, the aqueous plastic material dispersion according to the invention contains from 0 to 5% by weight, preferably from 0.1 to 4% by weight, particularly preferably from 1 to 4% by weight and in particular from 2 to 4% by weight, based on the total mass of the monomers used for the preparation of the vinyl ester copolymer P, of ionic emulsifiers (S1). The ionic emulsifiers include both anionic and cationic emulsifiers, anionic emulsifiers and mixtures of anionic emulsifiers being particularly preferred.

The anionic emulsifiers include alkali metal and ammonium salts of alkylsulfates (alkyl radical: $C_6$ to $C_{18}$), alkylphosphonates (alkyl radical: $C_6$ to $C_{18}$), of sulfuric monoesters or phosphoric mono- and diesters of ethoxylated alkanols (degree of ethoxylation: from 2 to 50, alkyl radical: $C_6$ to $C_{22}$) and ethoxylated alkylphenols (degree of ethoxylation: from 3 to 50, alkyl radical: $C_4$ to $C_9$), of alkanesulfonic acid (alkyl radical: $C_{12}$ to $C_{18}$), of alkylarylsulfonic acids (alkyl radical: $C_9$ to $C_{18}$), of sulfosuccinic monoesters and sulfosuccinic diesters of alkanols (alkyl radical: $C_{16}$ to $C_{22}$) and ethoxylated alkanols (degree of ethoxylation: from 2 to 50, alkyl radical: $C_6$ to $C_{22}$), and nonethoxylated and ethoxylated alkylphenols (degree of ethoxylation: from 3 to 50, alkyl radical: $C_4$ to $C_9$). As a rule, the emulsifiers mentioned are used in the form of technical-grade mixtures, the data on a length of the alkyl radical and EO chain being based on the respective maximum of the distribution occurring in the mixture. Examples of said emulsifier classes are ®Texapon K12 (sodium laurylsulfate from Cognis), ®Emulsogen EP ($C_{13}$–$C_{17}$-alkanesulfonate from Clariant), ®Maranil A 25 IS (sodium n-alkyl-($C_{10}$–$C_{13}$)-benzenesulfonate from Cognis), ®Genapol liquid ZRO (sodium $C_{12}$/$C_{14}$-alkyl ether sulfate having 3 EO units from Clariant), ®Hostapal BVQ=4 (sodium salt of a nonylphenol ether sulfate having 4 EO units from Clariant), ®Aerosol MA 80 (sodium dihexylsulfosuccinate from Cyctec Industries), ®Aerosol A-268 (disodium isodecylsulfosuccinate from Cytec Industries), ®Aerosol A-103 (disodium salt of a monoester of sulfosuccinic acid with an ethoxylated nonylphenol from Cytec Industries).

Compounds of the General Formula I

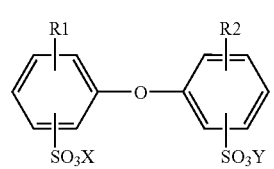

(I)

in which $R^1$ and $R^2$ are hydrogen and $C_4$–$C_{24}$-alkyl, preferably $C_6$–$C_{16}$-alkyl, and are not simultaneously hydrogen, and X and Y are alkali metal ions and/or ammonium ions, are furthermore suitable. Technical-grade mixtures which contain from 50 to 90% by weight of the monoalkylated product (for example Dowfax® 2A1 ($R_1$=$C_{12}$-alkyl; DOW Chemical), are frequently also used in the case of these emulsifiers. The compounds are generally known, for example from U.S. Pat. No. 4,269,749 and are commercially available.

In addition, the Gemini surfactants known to a person skilled in the art, as described, for example, in the article "Gemini-Tenside" [Gemini Surfactants] by F. M. Menger and J. S. Kelper (Angew. Chem. 2000, pages 1980–1996) and the publications cited therein, are also particularly suitable as ionic emulsifiers.

The cationic emulsifiers include, for example, alkylammonium acetates (alkyl radical: $C_8$ to $C_{12}$), quaternary compounds containing ammonium groups and pyridinium compounds.

When choosing the ionic emulsifiers, it should of course be ensured that incompatibilities in the resulting plastic material dispersion, which may lead to coagulation, are ruled out. Anionic emulsifiers in combination with anionic monomers (M3) or cationic emulsifiers in combination with cationic monomers (M3) are therefore preferably used, the combination of anionic emulsifiers and anionic monomers being particularly preferred.

In addition to the ionic emulsifiers, the aqueous plastic material dispersion according to the invention may also contain nonionic emulsifiers (S2). Suitable nonionic emulsifiers (S2) are araliphatic and aliphatic nonionic emulsifiers, for example ethoxylated mono-, di- and trialkylphenols (degree of ethoxylation: from 3 to 50, alkyl radical: $C_4$ to $C_9$), ethoxylates of long-chain, branched or straight-chain alcohols (degree of ethoxylation: 3 to 50, alkyl radical: $C_6$ to $C_{36}$), and polyethylene oxide/polypropylene oxide block copolymers. Ethoxylates of long-chain, branched or straight-chain alkanols (alkyl radical: $C_6$ to $C_{22}$, average degree of ethoxylation: from 3 to 50) are preferred, and among these those based on natural alcohols, Guerbet alcohols or oxo alcohols having a linear or branched $C_{12}$–$C_{18}$-alkyl radical and a degree of ethoxylation of from 8 to 50 are particularly preferably used.

Further suitable emulsifiers are described in Houben-Weyl, Methoden der organischen Chemie [Methods of Organic Chemistry], Volume XIV/1, Makromolekulare Stoffe [Macromolecular Substances], Georg-Thieme Verlag, Stuttgart, 1961, pages 192–208).

It is also possible to use both ionic and nonionic emulsifiers which contain one or more unsaturated double bond units as an additional functionality and can be incorporated as ethylenically unsaturated, ionic monomers (M3) or as ethylenically unsaturated, nonionic monomers (M5) into the resulting polymer chains during the polymerization process. These compounds referred to as copolymerizable emulsifiers ("surfmers") are generally known to a person skilled in the art. Examples are to be found in a number of publications (e.g.: "Reactive surfactants in heterophase polymerization" by A. Guyot et al. in Acta Polym. 1999, pages 57–66) and are commercially available (e.g. ®Emulsogen R208 from Clariant or Trem LF 40 from Cognis).

Moreover, the total mass of ionic emulsifiers (S1) and ethylenically unsaturated, ionic monomers (M3) which are used for stabilizing the plastic material dispersion is at least 2% by weight, preferably at least 3% by weight, based on the total mass of vinyl ester copolymer P.

In a particularly preferred embodiment of the present invention, nonionic components, i.e. nonionic emulsifiers (S2) and nonionic monomers (M5), which can likewise be used for stabilizing the plastic material dispersion, are generally dispensed with because the presence of such nonionic components has a disadvantageous effect on the blocking resistance of binder-rich coatings produced using these plastic material dispersions according to the invention.

If, however, for reasons relating to the stability in terms of colloid chemistry, it is not possible to dispense with such nonionic, stabilizing components, it is essential to ensure that the ratio of the total amount of ionic components (M3) and (S1) to the total amount of nonionic components (M5) and (S2) used does not fall below the value 1, preferably the value 2 and particularly preferably the value 10.

The present invention also relates to methods for producing the aqueous plastic material dispersions according to the invention which are based on vinyl ester copolymers.

The production of the aqueous plastic material dispersions according to the invention which are based on vinyl ester copolymers P can be effected, for example, by mixing two homo- or copolymers A and B prepared separately.

However, the production can also be effected by a so-called stepwise polymerization. Stepwise polymerization is generally understood as meaning a procedure in which, in a 1st stage, the monomers of the 1st stage are polymerized by a free radical, aqueous emulsion polymerization, preferably in the presence of seed latex, which is preferably prepared in situ, and the monomers of the 2nd stage are then polymerized in the aqueous dispersion of the resulting polymer of the 1st stage. If required, further polymerization stages can be effected. The comonomers of the 1st and 2nd stage differ regarding the type of monomers and/or with respect to the relative amounts of the monomers. Preferably, the type of monomers to be polymerized is the same for both stages. There are then only differences with regard to the relative amounts of the monomers.

When choosing the monomer composition of the individual stages, in general a procedure is adopted in which a monomer composition which leads to the formation of the homo- or copolymer B is chosen in the first stage and a corresponding monomer composition which leads to the formation of the homo- or copolymer A is polymerized in a further stage, preferably in the 2nd stage. However, it is also possible to proceed in a converse manner and to produce the homo- or copolymer B in the presence of the previously prepared homo- or copolymer A and, if required, further stages.

The vinyl ester copolymers P prepared by means of stepwise polymerization comprise, independently of the detectable morphology, all copolymers in which the homo- or copolymer components A and B have been produced by successive stages of the emulsion polymerization.

The monomer mixture for producing the homo- or copolymer A contains, based on the total amount of the monomers used for the preparation of the homo- or copolymer A, more than 50% by weight, preferably more than 70% by weight, particularly preferably more than 80% by weight and in particular from 80 to 95% by weight of monomers (M1) and less than 25% by weight, preferably from 5 to 20% by weight and particularly preferably from 10 to 15% by weight of monoolefins having 2 to 4 C atoms (M2) preferably up to 10% by weight, particularly preferably up to 5% by weight and in particular up to 3% by weight of ionic monomers (M3), the composition of the monomer mixture being chosen so that the homo- or copolymer polymerized separately with this monomer mixture has a glass transition temperature in the range of from 0 to 20° C., preferably in the range of from 0 to 15° C. and particularly preferably in the range of from 0 to 10° C.

The monomer mixture for producing the homo- or copolymer B contains, based on the total amount of the monomers used for the preparation of the homo- or copolymer B, more than 50% by weight, preferably more than 70% by weight, particularly preferably more than 80% by weight and in particular from 90 to 98% by weight of monomers (M1) and less than 25% by weight, preferably less than 20% by weight, particularly preferably less than 0.1 to 10% by weight and in particular from 0.1 to 5% by weight of monoolefins having 2 to 4 C atoms (M2) and preferably up to 10% by weight, particularly preferably up to 5% by weight and in particular from 0.1 to 3% by weight of ionic monomers (M3), the composition of the monomer mixture being chosen so that the homo- or copolymer polymerized separately with this monomer mixture has a glass transition temperature in the range from 20 to 50° C., preferably in the range of from 25 to 45° C. and particularly preferably in the range of from 30 to 43° C.

In addition, when choosing the monomer compositions of the two homo- or copolymers A and B of the heterogeneous vinyl ester copolymer P, it should be ensured that their glass transition temperatures differ by more than 10 K, preferably by more than 15 K and particularly preferably by more than 20 K.

When choosing the monomer compositions, it should moreover be ensured that, based on the total amount of the monomers used for the preparation of the copolymer P, less than 20% by weight, preferably from 0.1 to 20% by weight and particularly preferably from 0.1 to 15% by weight, of ethylenically unsaturated monoolefins having 2 to 4 carbon atoms (M2) are used.

In particular embodiments, it may be necessary to carry out the individual polymerization stages under different polymerization pressures owing to the different amounts of monoolefins (M2) which are present in the gaseous state of aggregation under the reaction conditions. In these cases, the pressure which is generated by metering the gaseous monoolefins (M2) is preferably between 0 and 10 bar, particularly preferably between 2 and 10 bar, during the polymerization of the monomer composition leading to copolymer B and preferably between 10 and 120 bar, particularly preferably between 20 and 60 bar, during the polymerization of the monomer composition leading to copolymer A.

Surprisingly, it was found that a polymerization of the individual stages up to monomer contents of <0.3%, as usually carried out for generating separate polymer phases, is not necessary for the preparation of the vinyl ester copolymers, P, copolymer A being produced in the presence of copolymer B.

In a particularly preferred embodiment, it is therefore sufficient if, after production of the copolymer B, the concentration of the monomer component(s) M2 which are present in gaseous form under the reaction conditions is gradually increased over an appropriate time interval for continuous metering of liquid monomer components, for generating the copolymer A (pressure increase). This method is distinguished by substantially reduced reactor utilization times compared with the methods usually used.

The polymerization is generally carried out at temperatures in the range of from 20 to 120° C., preferably in the range of from 40 to 95° C. and particularly preferably in the range of from 50 to 90° C.

The production of the aqueous plastic material dispersions according to the invention which are based on vinyl ester copolymers is preferably effected by free radical, aqueous emulsion polymerization of said monomers in the presence of at least one free radical polymerization initiator and at least one surface-active substance.

Suitable free radical polymerization initiators are all known initiators which are capable of initiating a free radical, aqueous emulsion polymerization. They may be both peroxides, such as, for example, alkali metal peroxodisulfates, and azo compounds. So-called redox initiators, which are composed of at least one organic and/or inorganic reducing agent and at least one peroxide and/or hydroperoxide, such as, for example, tert-butyl hydroperoxide with sulfur compounds, such as, for example, the sodium salts of hydroxymethanesulfinic acid, sodium sulfite, sodium disulfite, sodium thiosulfate and acetone bisulfate adducts, or hydrogen peroxide with ascorbic acid, can also be used as polymerization initiators. Combined systems which contain a small amount of a metal compound which is soluble in the polymerization medium and whose metallic component can occur in a plurality of valency states, such as, for example, ascorbic acid/iron(II) sulfate/hydrogen peroxide, can also be used, the sodium salt of hydroxmethylsulfic acid, acetone bisulfite adduct, sodium sulfite, sodium hydrogen sulfite or sodium bisulfite also frequently being used instead of ascorbic acid, and organic peroxides, such as, for example, tert-butyl hydroperoxide or alkali metal peroxodisulfates and/or ammonium peroxodisulfate, also frequently being used instead of hydrogen peroxide. Instead of said acetone bisulfite adduct, further bisulfite adducts known to a person skilled in the art, as described, for example, in EP-A-0 778 290 and in the literature cited therein, can also be used. Further preferred initiators are peroxodisulfates, such as, for example, sodium peroxodisulfate. The amount of the free radical initiator systems used is preferably from 0.05 to 2.0% by weight, based on the total amount of the monomers to be polymerized.

Protective colloids and the ionic and, if required, the nonionic emulsifiers S1 and S2 described above, whose relative molecular weights, in contrast to the protective colloids, are less than 2 000 g/mol, are usually used as surface-active substances in the emulsion polymerization.

The surface-active substances are usually used in amounts of up to 10% by weight, preferably from 0.5 to 7% by weight and particularly preferably from 1 to 6% by weight, based on the monomers to be polymerized.

Suitable protective colloids are, for example, polyvinyl alcohols, starch derivatives and cellulose derivatives and vinylpyrrolidone, polyvinyl alcohols and cellulose derivatives, such as, for example, hydroxyethylcelluloses, being preferred. A detailed description of further, suitable protective colloids is to be found in Houben-Weyl, Methoden der organischen Chemie [Methods of Organic Chemistry], Volume XIV/1, Makromolekulare Stoffe [Macromolecular Substances], Georg-Thieme Verlag, Stuttgart 1961, pages 411 to 420.

The molecular weight of the vinyl ester copolymers can be established by adding small amounts of one or more substances which regulate the molecular weight. These so-called "regulators" are generally used in an amount of up to 2% by weight, based on the monomers to be polymerized. All substances known to a person skilled in the art can be used as "regulators". For example, organic thio compounds, silanes, allyl alcohols and aldehydes are preferred.

The emulsion polymerization is usually effected by a batch procedure, preferably by a semicontinuous method. In semicontinuous methods, the main amount, i.e. at least 70%, preferably at least 90%, of the monomers to be polymerized is fed continuously, including the stepwise or gradient procedure, to the polymerization batch. This procedure is also referred to as the monomer feed method, monomer feed being understood as meaning the metering of gaseous monomers, liquid monomer mixtures, monomer solutions or in particular aqueous monomer emulsions. The metering of the individual monomers can be effected by separate feeds.

In addition to the seed-free production method, the emulsion polymerization can also be effected by the seed latex method or in the presence of seed latices produced in situ, for establishing a defined polymer particle size. Such methods are known and are described in detail in a multiplicity of patent applications (e.g. EP-A-0 040 419 and EP-A-0 567

812) and publications ("Encyclopedia of Polymer Science and Technology", Vol. 5, John Wiley & Sons Inc., New York 1966, page 847).

After the actual polymerization reaction, it may be desirable and/or necessary substantially to free the aqueous plastic material dispersions according to the invention from odorous substances, such as, for example, residual monomers and other volatile, organic components. This can be achieved in a manner known per se, for example physically by distillative removal (in particular by steam distillation) or by stripping with an inert gas. Furthermore, the reduction of the residual monomer may also be effected chemically by free radical postpolymerization, in particular with the action of redox initiator systems, as described, for example, in DE-A-44 35 423. The postpolymerization using a redox initiator system comprising at least one organic peroxide and one organic and/or inorganic sulfite is preferred. A combination of physical and chemical methods is particularly preferred, a reduction of the residual monomer content by chemical postpolymerization being followed by further reduction of the residual monomer content by means of physical methods to, preferably, <1 000 ppm, particularly preferably <500 ppm, in particular <100.

The aqueous plastic material dispersions according to the invention which are based on vinyl ester copolymers are used, for example, as binders in pigment-containing, aqueous formulations which serve for coating substrates. These include, for example, synthetic resin-bound renders, tile adhesives, coating materials, such as, for example, emulsion paints, emulsion finishes and glazes, joint sealing compounds and sealing compounds, preferably for porous components, but also paper coating slips.

The aqueous plastic material dispersions can, however, also be used directly or after addition of rheology-modifying additives and/or other components as aqueous formulations for coating substrates. Such aqueous formulations are, for example, primers, clear finishes or food coatings which protect food, such as, for example, cheese or meat-containing preparations, from harmful environmental influences and/or drying out.

The present invention therefore furthermore relates to aqueous formulations containing the aqueous plastic material dispersion according to the invention which is based on vinyl ester copolymers. A preferred embodiment of the aqueous formulation are pigment-containing, aqueous formulations.

These preferred, pigment-containing formulations, particularly preferably emulsion paints, contain in general from 30 to 75% by weight, preferably from 40 to 65% by weight, of nonvolatile components. These are understood as meaning all components of the formulation except for water, with at least the total amount of the solid binder, filler, pigment, plasticizer and polymeric assistant.

Of the nonvolatile components, preferably
- a) from 3 to 90% by weight, particularly preferably from 10 to 60% by weight, are accounted for by the solid binder, i.e. the vinyl ester copolymer P,
- b) from 5 to 85% by weight, particularly preferably from 10 to 60% by weight, are accounted for by at least one inorganic pigment,
- c) from 0 to 85% by weight, particularly preferably from 20 to 70% by weight, are accounted for by inorganic fillers and
- d) from 0.1 to 40% by weight, particularly preferably from 0.5 to 15% by weight, are accounted for by conventional assistants.

Solvent- and plasticizer-free, aqueous formulations are particularly preferred.

The pigment volume concentration (PVC) of the pigment-containing, aqueous formulations according to the invention is in general above 5%, preferably in the range of from 10 to 90%. In particularly preferred embodiments, the PVCs are either in the range of from 10 to 45% or in the range from 60 to 90%, in particular from 70 to 90%.

Pigments which may be used are all pigments known to a person skilled in the art for said intended use. Preferred pigments for the aqueous formulations according to the invention, preferably for emulsion paints, are, for example, titanium dioxide, preferably in the form of rutile, barium sulfate, zinc oxide, zinc sulfide, basic lead carbonate, antimony trioxide and lithopone (zinc sulfide and barium sulfate). However, the aqueous formulations can also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the formulations according to the invention may also contain organic colored pigments, for example sepia, gamboge, Kasset brown, toluidine red, para red, Hansa yellow, indigo, azo dyes, anthraquinoid and indigoid dyes and dioxazine, quinacridone, phthalocyanine, isoindolinone and metal complex pigments.

Fillers which may be used are all fillers known to a person skilled in the art for said intended use. Preferred fillers are aluminosilicates, such as, for example, feldspars, silicates, such as, for example, kaolin, talc, mica, magnesite, alkaline earth metal carbonates, such as, for example, calcium carbonate, for example in the form of calcite or chalk, magnesium carbonate, dolomite, alkaline earth metal sulfates, such as, for example, calcium sulfate, and silica. The fillers can be used either as individual components or as filler mixtures. Filler mixtures, such as, for example, calcium carbonate/kaolin and calcium carbonate/talc, are preferred in practice. Synthetic resin-bound renders may also contain relatively coarse additives, such as sands or sandstone granules.

In general, finely divided fillers are preferred in emulsion paints. In order to increase the hiding power and to save white pigments, finely divided fillers, such as, for example, precipitated calcium carbonate or mixtures of different calcium carbonates having different particle sizes, are frequently used in emulsion paints. Mixtures of colored pigments and fillers are preferably used for adjusting the hiding power of the hue and the depth of color.

The conventional assistants include wetting agents or dispersants, such as sodium, potassium or ammonium polyphosphates, alkali metal and ammonium salts of polyacrylic acids and of polymaleic acid, polyphosphonates, such as sodium 1-hydroxyethane-1,1-diphosphonate, and naphthalenesulfonic acid salts, in particular the sodium salts thereof. In addition, suitable amino alcohols, such as, for example, 2-amino-2-methylpropanol, may be used as dispersants. The dispersants or wetting agents are preferably used in an amount of from 0.1 to 2% by weight, based on the total weight of the emulsion paint.

Furthermore, the assistants may also comprise thickeners, for example cellulose derivatives, such as methylcellulose, hydroxyethylcellulose and carboxymethylcellulose, and furthermore casein, gum arabic, tragacanth gum, starch, sodium alginate, polyvinyl alcohol, polyvinylpyrrolidone, sodium polyacrylates, water-soluble copolymers based on acrylic and (meth)acrylic acid, such as acrylic acid/acrylamide and (meth)acrylic acid/acrylic ester copolymers and so-called associative thickeners, such as styrene/maleic anhydride polymers or preferably hydrophobically modified polyetherurethanes (HEUR) known to a person skilled in the art, hydrophobically modified acrylic acid copolymers (HASE) and polyetherpolyols.

Inorganic thickeners, such as, for example, bentonites or hectorite, may also be used.

The thickeners are preferably used in amounts of from 0.1 to 3% by weight, particularly preferably from 0.1 to 1% by weight, based on the total weight of the aqueous formulation.

The aqueous formulations according to the invention may also contain crosslinking additives. Such additives may be: aromatic ketones, such as, for example, alkyl phenyl ketones, which optionally have one or more substituents on the phenyl ring, or benzophenone or substituted benzophenones as photoinitiators. Photoinitiators suitable for this purpose are disclosed, for example, in DE-A-38 27 975 and EP-A-0 417 568. Suitable, crosslinking compounds are also water-soluble compounds having at least two amino groups, for example dihydrazides of aliphatic dicarboxylic acids, as disclosed, for example, in DE-A-39 01 073, if the vinyl ester copolymer p contains, incorporated as copolymerized units, monomers containing carbonyl groups.

In addition, waxes based on paraffins and polyethylene, and dulling agents, antifoams, preservatives and water repellents, biocides, fibers and further additives known to a person skilled in the art may be used as assistants in the aqueous formulations according to the invention.

The dispersions according to the invention can be used to prepare not only solvent- and plasticizer-free formulations but of course also coating systems which contain solvents and/or plasticizers as film formation assistants. Film formation assistants are generally known to a person skilled in the art and can usually be used in amounts of from 0.1 to 20% by weight, based on the vinyl ester copolymer P contained in the formulation, so that the aqueous formulation has a minimum film formation temperature of less than 15° C., preferably in the range of from 0 to 10° C. The use of these film formation assistants is, however, not necessary in view of the advantageous properties of the plastic material dispersions according to the invention. In a preferred embodiment, the aqueous formulations according to the invention therefore contain no film formation assistant.

The aqueous formulations according to the invention are stable fluid systems which can be used for coating a multiplicity of substrates. Consequently, the present invention also relates to methods for coating substrates and the coating materials themselves. Suitable substrates are, for example, wood, concrete, metal, glass, ceramics, plastics, renders, wallpapers, paper, coated, primed or weathered substrates. The application of the formulation to the substrate to be coated is effected in a manner dependent on the nature of the formulation. Depending on the viscosity and the pigment content of the formulation and on the substrate, the application can be effected by means of roll-coating, brushing or knife coating or as a spray.

The advantageous properties of the vinyl ester copolymer P as a binder compared with vinyl ester copolymers from the prior art, especially the improved blocking resistance in binder-rich coating compositions, is particularly evident in the case of pigment-containing formulations having a PVC of <45%, preferably from 10 to 45%.

In addition, those vinyl ester copolymers P which contain organosilicon compounds incorporated as copolymerized units not only improve blocking resistance in binder-rich coating compositions having a PVC of less than 45% but also further advantageous properties, such as improved wet abrasion resistance, in aqueous formulations having a PVC of >60%. Improved wet abrasion resistance, i.e. improved mechanical stability of the coating to abrasive influences in the moist state, is advantageous for the wet cleaning resistance of the coatings as well as in outdoor applications, for example for stability to weathering, and ensures that the coatings are washable. Thus, the advantages of the vinyl ester copolymers P according to the invention which contain organosilicon compounds are particularly evident in formulations which have a PVC in the range of from 10 to 90%, for example in the case of a PVC in the range of from 10 to 45% or in the case of a PVC in the range of from 60 to 90%, in particular from 70 to 90%.

The invention is described in more detail below with reference to working examples, but without being restricted thereby in any way.

I. Production and Characterization of Plastic Material Dispersions According to the Invention The dispersions produced in the examples and comparative examples are produced in a 70 l pressure-resistant autoclave having jacket cooling and a permissible pressure range of up to 160 bar. Parts and percentages used in the examples below are based on weight, unless stated otherwise.

The viscosities of the dispersions are determined using a Haake rotational viscometer (Rheomat® VT 500) at room temperature and a shear gradient of 17.93 s$^{-1}$.

The mean particle size and the particle size distribution are determined by laser and white light aerosol spectroscopy. The stated particle sizes correspond to the particle diameter after drying.

The amounts of residual monomers stated in the examples are determined by gas chromatography (GC).

The determination of the minimum film formation temperature (MFT) of the polymer dispersion is effected on the basis of Ullmans Enzyclopädie der technischen Chemie [Ullmann's Encyclopedia of Industrial Chemistry], 4th edition, Vol. 19, V C H Weinheim 1980, page 17. The measuring apparatus used is a so-called film formation bench which consists of a metal plate to which a temperature gradient is applied and on which the temperature sensors are mounted at various points for temperature calibration, the temperature gradient being chosen so that one end of the film formation bench has a temperature above the MFT to be expected and the other end has a temperature below the MFT to be expected. The aqueous polymer dispersion is then applied to the film formation bench. In those regions of the film formation bench whose temperature is above the MFT, a clear film forms on drying, whereas tears occur in the cooler regions and, at even lower temperatures, a white powder forms. On the basis of the known temperature profile of the plate, the MFT is determined visually as the temperature at which a tear-free film is first present.

The glass transition temperature of the individual polymerization stages is calculated approximately according to the Fox equation, taking into account the main monomers. The glass transition temperatures of the homopolymers corresponding to the individual monomers are used as a basis for calculation, as described in Ullmann's Enzyclopädia of Industrial Chemistry, VCH Weinheim, Vol. A 21 (1992), page 169, or in Brandrup, E. H. Immergut Polymer Handbook, 3$^{rd}$ ed, J. Wiley, New York 1989. A glass transition temperature of the homopolymer of 148 K is taken for ethene (cf. Brandrup, E. H. Immergut Polymer Handbook, 3$^{rd}$ ed, J. Wiley, New York 1989, page VI/214) and a glass transition temperature of the homopolymer of 315 K is taken for vinyl acetate (cf. Ullmann's Enzyclopädia of Industrial Chemistry, V C H Weinheim, Vol. A 21 (1992), page 169).

The data on the ethene content are based on the relative proportion by weight of ethene in the monomer units in the copolymer P.

COMPARATIVE EXAMPLE A1

Polymerization Stage I:

A solution (initially introduced mixture) consisting of the following components is introduced into a 70 l pressure-resistant reaction vessel having a temperature-regulating means, stirrer, metering pumps and a metering means for gaseous ethene (mass flow rate measurement):

| | |
|---|---|
| 8 060 g | of water |
| 88.55 g | of sodium acetate |
| 594.5 g | of 30% strength sodium ethenesulfonate solution in water |
| 70.45 g | of sodium laurylsulfate (® Texapon K12 granules, Cognis) |
| 5 284 g | of 20% strength solution of a nonylphenol ethoxylate having 30 ethylene oxide units (® Arkopal N300, Clariant) in water |
| 34.87 g | of a 1% strength solution of Fe(II) SO$_4$.7H$_2$O in water |
| 14 240 g | of a 5% strength solution of hydroxyethylcellulose in water (HEC solution) (viscosity of the 2% strength by weight aqueous solution 350 mPa · s) |

The pH of the initially introduced component is 7.2. The apparatus is freed of atmospheric oxygen by evacuating twice and flushing with nitrogen. It is evacuated a third time and a total of 350 g of ethene are forced into the apparatus, the internal pressure of the vessel being about 7 bar after this amount of ethene has been metered in. Thereafter, the ethene feed is closed and 3 170 g of vinyl acetate and 2.82 g of ®Rongalit C (BASF), dissolved in 208 g of water, are metered in. Thereafter, the internal temperature is increased to 60° C. On reaching an internal temperature of 50° C., a mixture of 4.0 g of an aqueous 70% strength tert-butyl hydroperoxide solution and 208 g of water is metered in, and cooling is effected to remove the heat of reaction. On reaching an internal temperature of 60° C., 7 133 g of vinyl acetate are metered in in the course of 90 minutes, and a solution of 9.1 g of ®Rongalit C in 669 g of water and a mixture of 12.9 g of an aqueous 70% strength tert-butyl hydroperoxide solution and 669 g of water in the course of 130 minutes. The internal temperature is kept at 60° C. over the entire metering time. A dispersion sample which was taken after the end of the meterings of the initiator components has a residual vinyl acetate content of <0.3% and a solids content of 31.2%.

Polymerization Stage 2:

After the end of the metering of the initiator solutions of the first stage, the ethene valve is opened and the internal pressure of the vessel increased to 40 bar at an internal temperature of 60° C. by metering in ethene. After the internal pressure of the vessel has reached 40 bar, 21 400 g of vinyl acetate and a solution of 18.8 g of ®Rongalit C in 1 389 g of water and a mixture of 27.0 g of an aqueous 70% strength solution of tert-butyl hydroperoxide solution and 1 389 g of water are metered in at an internal temperature of 60° C. in the course of 270 minutes. The ethene feed remains open at an internal pressure of 40 bar until a further 3 172 g of ethene have been metered in. After the end of all meterings, a solution of 35.7 g of sodium peroxodisulfate in 832 g of water is added, the internal temperature is increased to 80° C. and, after the end of the reaction, cooling is effected for a further hour. The internal pressure of the vessel after cooling to 30° C. is 0.15 bar.

EXAMPLE A2

The dispersion is produced analogously to the production of the dispersion described under example A1. In contrast to this, a solution of the following components was used as the initially introduced mixture:

| | |
|---|---|
| 10 580 g | of water |
| 88.55 g | of sodium acetate |
| 594.5 g | of 30% strength sodium ethenesulfonate solution in water |
| 2 439 g | of a 30% strength solution of a sodium C$_{13}$–C$_{17}$-alkanesulfonate in water (® Emulsogen EP, Clariant) |
| 34.87 g | of a 1% strength solution of Fe(II) SO$_4$.7H$_2$O in water |
| 14 240 g | of a 5% strength solution of hydroxyethylcellulose in water (HEC solution) (viscosity of the 2% strength by weight aqueous solution 350 mPa · s) |

The pH of the initially introduced mixture is 7.3.

A dispersion sample which is taken at the end of the polymerization stage 1 has a residual vinyl acetate content of <0.3% and a solids content of 30.8%. The internal pressure of the vessel after the end of the reaction and cooling to 30° C. is 0.24 bar.

EXAMPLE A3

A solution consisting of the following components is introduced as an initially introduced mixture into a 70 l pressure-resistant reaction vessel having a temperature-regulating means, stirrer, metering pumps and a metering means for gaseous ethene:

| | |
|---|---|
| 10 955 g | of water |
| 88.55 g | of sodium acetate |
| 594.5 g | of 30% strength sodium ethenesulfonate solution in water |
| 2 439 g | of a 30% strength solution of a sodium C$_{13}$—C$_{17}$-alkanesulfonate in water (® Emulsogen EP, Clariant) |
| 34.87 g | of a 1% strength solution of Fe(II) SO$_4$.7H$_2$O in water |
| 14 240 g | of a 5% strength solution of hydroxyethylcellulose in water (HEC solution) (viscosity of the 2% strength by weight aqueous solution 350 mPa · s) |

The pH of the initially introduced mixture is 7.3. The apparatus is then freed of atmospheric oxygen by evacuating twice and flushing with nitrogen. It is evacuated a third time and a total of 350 g of ethene are forced into the apparatus (beginning of polymerization stage 1), the internal pressure of the vessel being about 7 bar after this amount of ethene has been metered in. Thereafter, the ethene feed is closed and 3170 g of vinyl acetate and 2.82 g of ®Rongalit C, dissolved in 208 g of water, are metered in. The internal temperature is then increased to 60° C. On reaching an internal temperature of 50° C., a solution of 4.0 g of an aqueous 70% strength tert-butyl hydroperoxide solution in 208 g of water is metered in and cooling is effected to remove the heat of reaction. When an internal temperature of 60° C. has been reached, 28 532 g of vinyl acetate and 25.4 g of ®Rongalit C, dissolved in 1 871 g of water, and a mixture of 36.2 g of an aqueous 70% strength tert-butyl hydroperoxide solution and 1 871 g of water are metered in in the course of 360 minutes. The internal temperature is kept at 60° C. over the entire metering time. 90 minutes after the beginning of metering, the ethene feed is opened again (beginning of polymerization stage 2) and the internal pressure of the vessel is increased to 40 bar by metering in ethene, the ethene feed remaining opened at this internal pressure until a further 3 172 g of ethene have been metered in. A dispersion sample taken after 90 minutes has a residual vinyl acetate content of 0.89% and a solids content of 30.8%. After all meterings have been terminated, a solution of 35.7 g of sodium peroxodisulfate in 832 g of water is added, the internal temperature is increased to 80° C. and, after the end of the reaction, cooling is effected after a further hour. The internal pressure of the vessel after cooling to 30° C. is 0.25 bar.

EXAMPLE A4

The dispersion is produced analogously to the production of the dispersion described under example A3. In contrast, a solution consisting of the following components is used as the initially introduced mixture:

| | |
|---|---|
| 12 663 g | of water |
| 88.55 g | of sodium acetate |
| 594.5 g | of 30% strength sodium ethenesulfonate solution in water |
| 731.7 g | of sodium laurylsulfate (® Texapon K12 granules, Cognis) |
| 34.87 g | of a 1% strength solution of Fe(II) $SO_4.7H_2O$ in water |
| 14 240 g | of a 5% strength solution of hydroxyethylcellulose in water (HEC solution) (viscosity of the 2% strength aqueous solution 350 mPa · s) |

The pH of the initially introduced mixture is 10.2. The internal pressure of the vessel after the end of the reaction and cooling to 30° C. is 0.24 bar.

EXAMPLE A5

The dispersion is produced analogously to the production of the dispersion described under example A3. In contrast, a solution consisting of the following components is used as the initially introduced mixture:

| | |
|---|---|
| 10 781 g | of water |
| 88.55 g | of sodium acetate |
| 594.5 g | of 30% strength sodium ethenesulfonate solution in water |
| 2 613 g | of a 28% strength solution of a sodium $C_{12}/C_{14}$-alkyl ether sulfate having 3 ethylene oxide units in water (® Genapol ZRO liquid, Clariant) |
| 34.87 g | of a 1% strength solution of Fe(II) $SO_4.7H_2O$ in water |
| 14 240 g | of a 5% strength solution of hydroxyethylcellulose in water (HEC solution) (viscosity of the 2% strength aqueous solution 350 mPa · s) |

The pH of the initially introduced mixture is 10.3. The internal pressure of the vessel after the end of the reaction and cooling to 30° C. is 1.6 bar.

EXAMPLE A6

The dispersion is produced analogously to the production of the dispersion described under example A2. In contrast, instead of the amounts by weight of vinyl acetate stated in example A2 (31 703 g altogether), in each case identical amounts by weight of a mixture of 99.555% by weight of vinyl acetate and 0.445% by weight of γ-methacryloyloxypropyltrimethoxysilane (altogether 31 562 g of vinyl acetate and 141 g of γ-methacryloyloxypropyltrimethoxysilane) are metered in. A dispersion sample which is taken at the end of polymerization stage 1 has a residual vinyl acetate content of <0.3% and a solids content of 29.8%. The internal pressure of the vessel after the end of the reaction and cooling to 30° C. is 0.7 bar.

EXAMPLE A7

The dispersion is produced analogously to the production of the dispersion described under example A3. In contrast, instead of the amounts by weight of vinyl acetate stated in example 3 (31 703 g altogether), in each case identical amounts by weight of a mixture of 99.555% by weight of vinyl acetate and 0.445% by weight of γ-methacryloyloxypropyl-trimethoxysilane (altogether 31 562 g of vinyl acetate and 141 g of γ-methacryloyloxypropyltrimethoxysilane) are metered in. A dispersion sample which is taken at the end of polymerization stage 1 has a residual vinyl acetate content of 0.9% and a solids content of 28.5%. The internal pressure of the vessel after the end of the reaction and cooling to 30° C. is 0.35 bar.

EXAMPLE A8

The dispersion is produced analogously to the production of the dispersion described under example A4. In contrast, instead of the amounts by weight of vinyl acetate stated in example A4 (31 703 g altogether), in each case identical amounts by weight of a mixture of 99.555% by weight of vinyl acetate and 0.445% by weight of γ-methacryloyloxypropyl-trimethoxysilane (altogether 31 562 g of vinyl acetate and 141 g of γ-methacryloyloxypropyltrimethoxysilane) are metered in. The internal pressure of the vessel after the end of the reaction and cooling to 30° C. is 2.0 bar.

In table 1 below, the monomer compositions used for the production of the dispersions for the amounts by weight of emulsifiers used in examples A1 to A8, and the monomer compositions used for the production of the individual copolymerization stages are summarized.

TABLE 1

Composition of the dispersions from examples A1 to A8

| | A1[a] | A2 | A3 | A4 | A5 | A6 | A7 | A8 |
|---|---|---|---|---|---|---|---|---|
| Monomer composition: copolymer P (% by weight[b]) | | | | | | | | |
| Vinyl ester (M1) | 89.5 | 89.5 | 89.5 | 89.5 | 89.5 | 89.1 | 89.1 | 89.1 |
| Monoolefins (M2) | 10.0 | 10.0 | 10.0 | 10.0 | 10.0 | 10.0 | 10.0 | 10.0 |
| Ionic monomers (M3) | 0.5 | 0.5 | 0.5 | 0.5 | 0.5 | 0.5 | 0.5 | 0.5 |
| Silane monomers (M4) | — | — | — | — | — | 0.4 | 0.4 | 0.4 |
| Ratio of copolymer A/B | 69.4/30.6 | 69.4/30.6 | 69.4/30.6 | 69.4/30.6 | 69.4/30.6 | 69.4/30.6 | 69.4/30.6 | 69.4/30.6 |
| Emulsifiers (% by weight[b]) | | | | | | | | |
| Ionic emulsifiers (S1) | 0.2 | 2.1 | 2.1 | 2.1 | 2.1 | 2.1 | 2.1 | 2.1 |
| Nonionic emulsifiers (S2) | 3.0 | — | — | — | — | — | — | — |
| Monomer composition: copolymer A (% by weight[c]) | | | | | | | | |
| Vinyl ester (M1) | 87.1 | 87.1 | 87.1 | 87.1 | 87.1 | 86.7 | 87.6 | 86.7 |
| Monoolefins (M2) | 12.9 | 12.9 | 12.9 | 12.9 | 12.9 | 12.9 | 12.9 | 12.9 |
| Silane monomers (M4) | — | — | — | — | — | 0.4 | 0.4 | 0.4 |
| Tg (A) [° C.] | about 2 | about 2 | about 2 | about 2 | about 2 | about 2 | about 2 | about 2 |
| Monomer composition: copolymer B (% by weight[d]) | | | | | | | | |
| Vinyl ester (M1) | 95.1 | 95.1 | 95.1 | 95.1 | 95.1 | 94.7 | 94.7 | 94.7 |
| Monoolefins (M2) | 3.2 | 3.2 | 3.2 | 3.2 | 3.2 | 3.2 | 3.2 | 3.2 |
| Ionic monomers (M3) | 1.7 | 1.7 | 1.7 | 1.7 | 1.7 | 1.7 | 1.7 | 1.7 |
| Silane monomers (M4) | — | — | — | — | — | 0.4 | 0.4 | 0.4 |
| Tg (B) [° C.] | about 31 | about 31 | about 31 | about 31 | about 31 | about 31 | about 31 | about 31 |

[a] Comparative example;
[b] % by weight are based on the total mass of the monomers used for the preparation of the copolymers P;
[c] % by weight are based on the total mass of the monomers used for the preparation of the copolymer A;
[d] % by weight are based on the total mass of the monomers used for the preparation of the copolymer B;
[e] glass transition temperatures of the polymerization stages (calculated according to Fox)

The characteristic data of the dispersions from examples A1 to A8 and of a commercial, homogeneous vinyl acetate/ethene copolymer dispersion V2 (Tg: 14° C., DSC analysis, heating rate 20 K/min) are contained in table 2.

TABLE 2

Characteristic data of the dispersions from examples A1 to A8

| | A1[a] | A2 | A3 | A4 | A5 | A6 | A7 | A8 | V2[a] |
|---|---|---|---|---|---|---|---|---|---|
| Solids [%] | 54.0 | 53.6 | 53.7 | 53.9 | 53.3 | 53.8 | 53.3 | 53.4 | 53.0 |
| pH | 4.9 | 4.9 | 4.9 | 4.9 | 4.8 | 4.9 | 4.9 | 4.6 | 4.4 |
| Particle size distribution [nm] | 100–500 | 100–500 | 100–500 | 100–500 | 100–500 | 100–500 | 100–500 | 100–500 | 100–500 |
| Weight average particle diameter [nm] | 218 | 301 | 266 | 273 | 174 | 328 | 258 | 302 | 214 |
| Viscosity [Pa·s] | 1.31 | 0.312 | 0.380 | 0.475 | 1.12 | 0.380 | 0.362 | 0.340 | 1.04 |
| Residual monomer content (GC) [%] | <0.15 | <0.15 | <0.15 | <0.15 | <0.15 | <0.15 | <0.15 | <0.15 | <0.15 |
| MFT [° C.] | 3 | 3 | <0 | 4 | <0 | 2 | <0 | 6 | <0 |

[a] Comparative example;
[b] minimum film formation temperature

The performance characteristics (surface tack) of coating materials which are obtained after drying of the pure dispersions A1 to A8 and V2 are summarized in table 3.

The results of testing the performance characteristics of the coating materials according to the invention in table 3, which are obtained after drying the pure dispersions from examples A2 to A8, clearly show that, compared with a vinyl acetate/ethene copolymer dispersion known from the prior art and according to example A1 and a commercial, homogeneous vinyl acetate/ethene copolymer dispersion V2, substantially lower surface tack of the dried coating can be achieved by the heterogeneity according to the invention and predominant stabilization with ionic components.

TABLE 3

Surface tack of dried dispersion films

| Dispersion | Stabilization of the dispersion | | Surface tack |
|---|---|---|---|
| | $\Sigma M_5{}^{a)}$ and $S_2{}^{b)}$ [%]$^{e)}$ | $\Sigma M_3{}^{c)}$ and $S_1{}^{d)}$ [%]$^{e)}$ | |
| A1 (V1$^{f)}$) | 3 | 0.7 | 6 |
| A1 | 0 | 2.6 | 3 |
| A3 | 0 | 2.6 | 4 |
| A4 | 0 | 2.6 | 3 |
| A5 | 0 | 2.6 | 1 |
| A6 | 0 | 2.6 | 3 |
| A7 | 0 | 2.6 | 3 |
| A8 | 0 | 2.6 | 1 |
| V2$^{g)}$ | —$^{h)}$ | —$^{h)}$ | 6 |

$^{a)}$M$_5$: Nonionic monomers;
$^{b)}$S$_2$: non-ionic emulsifiers;
$^{c)}$M$_3$: Ionic monomers;
$^{d)}$S$_1$: Ionic emulsifiers;
$^{e)}$Stated percentages are based on the total amount of the monomers used for the production of the dispersion;
$^{f)}$Comparative dispersion 1;
$^{g)}$Comparative dispersion 2: commercial, homogeneous vinyl acetate/ethene copolymer dispersion;
$^{h)}$not specified.

II. Preparation of the Pigment-containing Formulations According to the Invention II.1. Solvent-Free Dispersion Finish Having a PVC of 16.8%; Formulation (I) (Comparative Examples B1 and B9), Examples B2 to B8)

The Following components are initially introduced into a vessel:

| 86.0 g | of water |
|---|---|
| 8.0 g | of dispersant Lopon ® 890; BK Guilini Chemie GmbH & Co. OHG |
| 2.0 g | of dispersant 2-amino-2-methylpropanol (90% in water) |
| 2.0 g | of antifoam Agitan ® 295; Münzing-Chemie GmbH, Heilbronn |
| 2.0 g | of preservative Mergal ® K 10 N; Troy Chemie GmbH, Seelze |
| 3.0 g | of concentrated ammonia solution (25%) |

The following are added to these with stirring:

| 210.0 g | of titanium dioxide pigment Kronos ® 2300; Kronos Titan GmbH, Leverkusen |
|---|---|

The components are mixed for 20 minutes in a high-speed disperser. The following components are then added with stirring:

| 528.3 g | of polymer dispersion A from I.) or V2 (53.0% strength by weight) |
|---|---|
| 113.7 g | of water |
| 25.0 g | of a 30% strength by weight aqueous solution of an acrylate thickener; Mowlith ® VDM 7000; Clariant |
| 20.0 g | of wax dispersion (30% in water) Südranol ® 240; Süddeutsche Emulsions-Chemie GmbH Chemische Fabrik, Mannheim |

The PVC of the solvent- and plasticizer-free dispersion finish is 16.8%. The results of testing the performance characteristics are summarized in table 4.

The dispersion finishes according to the invention of examples B2 to B8 clearly show that, in comparison with a heterogeneous vinyl acetate/ethene copolymer dispersion known from the prior art in dispersion finishing sample B1 and a commercial homogeneous vinyl acetate/ethene copolymer dispersion in example 9, solvent- and plasticizer-free dispersion finishes which are distinguished by a substantially improved performance profile, in particular increased blocking resistances and in some cases improved gloss properties, can be prepared owing to the heterogeneity according to the invention and predominant stabilization of the dispersions A2 to A8 according to the invention with ionic components.

TABLE 4

Testing of performance characteristics of formulation I

| Dispersion finish | Dispersion | Stabilization of the dispersion | | Blocking resistance | Gloss 20° [scale divs.] |
|---|---|---|---|---|---|
| | | $\Sigma M_5{}^{a)}$ and $S_2{}^{b)}$ [%]$^{e)}$ | $\Sigma M_3{}^{c)}$ and $S_1{}^{d)}$ [%]$^{e)}$ | | |
| B1 (V1$^{f)}$) | A1 (V1$^{g)}$) | 3 | 0.7 | 5 | 53 |
| B2 | A2 | 0 | 2.6 | 2 | 52 |
| B3 | A3 | 0 | 2.6 | 2 | 56 |
| B4 | A4 | 0 | 2.6 | 1 | 50 |
| B5 | A5 | 0 | 2.6 | 3 | 54 |
| B6 | A6 | 0 | 2.6 | 2 | 54 |
| B7 | A7 | 0 | 2.6 | 2 | 56 |
| B8 | A8 | 0 | 2.6 | 1 | 47 |
| B9 (V1$^{f)}$) | V2$^{g)}$ | —$^{h)}$ | —$^{h)}$ | 5 | 49 |

$^{a)}$M$_5$: nonionic monomers;
$^{b)}$S$_2$: nonionic emulsifiers;
$^{c)}$M$_3$: Ionic monomers;
$^{d)}$S$_1$: Ionic emulsifiers;
$^{e)}$Stated percentages are based on the total amount of the monomers used for the production of the dispersion;
$^{f)}$Comparative example;
$^{g)}$Comparative dispersion;
$^{h)}$not specified.

II.2 Solvent- and Plasticizer-free Emulsion Paint Having a PVC of 32.6%; Formulation (II) (Comparative Examples C1 and C9, Examples C2 to C8)

The following components were initially introduced into a vessel:

| 178.2 g | of water |
|---|---|
| 2.0 g | of rheology assistant hydroxyethylcellulose having a viscosity of 6 Pa · s (determined as a 1.9% strength solution in water at 25° C.); Tylose ® H 6000 YP2; Clariant |

-continued

| | |
|---|---|
| 4.1 g | of dispersant Lopon ® 894; BK Guilini Chemie GmbH & Co. OHG |
| 4.1 g | of antifoam Agitan ® 295; Münzing-Chemie GmbH, Heilbronn |
| 2.0 g | of sodium hydroxide solution (10%) |
| 2.0 g | of preservative Mergal ® K 9 N; Troy Chemie GmbH, Seelze |

The following are added to these with stirring:

| | |
|---|---|
| 202.5 g | of titanium dioxide pigment Kronos ® 2190; Kronos Titan GmbH, Leverkusen |
| 151.9 g | of calcium carbonate, calcite precipitated, 1 μm calcite, mean particle size 1 μm; Omya Carb extra-Cl; Omya GmbH, Cologne |

The components are mixed for 20 minutes in a high-speed disperser. The following components are then added with stirring:

| | |
|---|---|
| 453.2 g | of polymer dispersion A from I.) or V2 (53.0% strength by weight) |

The PVC of the solvent- and plasticizer-free emulsion paint is 32.6%. The results of the testing of the performance characteristics are summarized in table 5.

The emulsion paints according to the invention of examples C2 to C8 clearly show that, in comparison with a heterogeneous vinyl acetate/ethene copolymer dispersion known from the prior art in example C1, solvent-free and plasticizer-free emulsion paint having high binder contents (PVC=32.6%), which are distinguished by a substantially improved performance profile, can be prepared owing to the heterogeneity according to the invention and the predominant stabilization of the dispersions A2 to A8 according to the invention with ionic components. The improved blocking resistances compared with examples C1 and C9 and improved gloss properties of examples C2 to C8 compared with C1, with comparable abrasion properties, are to be singled out in particular.

TABLE 5

Testing of the performance characteristics of formulation II

| Emulsion paint | Dispersion | Stabilization of the dispersion ΣM$_5$[a] and S$_2$[b] [%][e] | ΣM$_3$[c] and S$_1$[d] [%][e] | Blocking resistance | Abrasion resistance | Gloss 60° [scale divs.] |
|---|---|---|---|---|---|---|
| C1 (V[1]) | A1 (V1[g]) | 3 | 0.7 | 5 | 1 | 25 |
| C2 | A2 | 0 | 2.6 | 3 | 1 | 29 |
| C3 | A3 | 0 | 2.6 | 2 | 1 | 30 |
| C4 | A4 | 0 | 2.6 | 1 | 2 | 26 |
| C5 | A5 | 0 | 2.6 | 3 | 1 | 30 |
| C6 | A6 | 0 | 2.6 | 2 | 1 | 25 |
| C7 | A7 | 0 | 2.6 | 2 | 1 | 25 |
| C8 | A8 | 0 | 2.6 | 1 | 2 | 26 |
| C9 (V[1]) | v2[g] | —[h] | —[h] | 5 | 2 | 31 |

[a]M$_5$: nonionic monomers;
[b]S$_2$: nonionic emulsifiers;
[c]M$_3$: Ionic monomers;
[d]S$_1$: Ionic emulsifiers;
[e]Stated percentages are based on the total amount of the monomers used for the production of the dispersion;
[f]Comparative example;
[g]Comparative dispersion;
[h]not specified.

II.3 Solvent- and Plasticizer-free Emulsion Paint Having a PVC of 35.3%; Formulation (III) (Comparative Examples D1 and D9, Examples D2 to D8)

The following components are initially introduced into a vessel:

| | |
|---|---|
| 186.0 g | of water |
| 2.1 g | of rheology assistant hydroxyethylcellulose having a viscosity of 6 Pa · s (determined as 1.9% strength solution in water at 25° C.); Tylose ® H 6000 YP2; Clariant |
| 4.2 g | of dispersant Lopon ® 894; BK Guilini Chemie GmbH & Co. OHG |
| 4.2 g | of antifoam Agitan ® 295; Münzing-Chemie GmbH, Heilbronn |
| 2.1 g | of sodium hydroxide solution (10%) |
| 2.1 g | of preservative Mergal ® K 9 N; Troy Chemie GmbH, Seelze |

The following were added to these with stirring:

| | |
|---|---|
| 211.4 g | of titanium dioxide pigment Kronos ® 2190; Kronos Titan GmbH, Leverkusen |
| 158.6 g | of calcium carbonate, calcite 1 μm, calcite having a mean particle size of 1 μm; Omya Carb extra-CL; Omya GmbH, Cologne |

The components are mixed for 20 minutes in a high-speed disperser. The following components are then added with stirring:

| | |
|---|---|
| 15.9 g | of rheology assistant: 20% strength by weight aqueous solution of an associatively thickening polyurethane; Tafigel ® PUR 50; Münzing-Chemie GmbH, Heilbronn |
| 420.0 g | of polymer dispersion A from I.) or V2 (53.0% strength by weight) |

The PVC of the solvent- and plasticizer-free emulsion paint is 35.3%. The results of the testing of the performance characteristics are summarized in table 6.

The emulsion paints according to the invention of examples D2 to D8 clearly show that, in comparison with a heterogeneous vinyl acetate/ethene copolymer dispersion known from the prior art in example D1 and a commercial homogeneous vinyl acetate/ethene copolymer dispersion in example D9, solvent- and plasticizer-free emulsion paints having a high binder content (PVC=35.5%), which is distinguished by a substantially improved performance profile, can be prepared owing to the heterogeneity according to the invention and predominant stabilization of the dispersions A2 to A8 according to the invention with ionic components. The improved blocking resistances compared with examples D1 and D9 and the improved gloss properties of examples D2 to D8 compared with D1, with comparable abrasion properties, are to be singled out in particular.

TABLE 6

Testing of the performance characteristics of formulation III

| Emulsion paint | Dispersion | Stabilization of the dispersion Σ $M_5$[a)] and $S_2$[b)] [%][e)] | Σ $M_3$[c)] and $S_1$[d)] [%][e)] | Blocking resistance | Abrasion resistance | Gloss 60° [scale divs.] |
|---|---|---|---|---|---|---|
| D1 (V[1)]) | A1 (V1[g)]) | 3 | 0.7 | 5 | 1 | 18 |
| D2 | A2 | 0 | 2.6 | 2 | 1 | 23 |
| D3 | A3 | 0 | 2.6 | 3 | 1 | 23 |
| D4 | A4 | 0 | 2.6 | 1 | 2 | 20 |
| D5 | A5 | 0 | 2.6 | 3 | 1 | 26 |
| D6 | A6 | 0 | 2.6 | 1 | 1 | 20 |
| D7 | A7 | 0 | 2.6 | 2 | 1 | 23 |
| D8 | A8 | 0 | 2.6 | 1 | 2 | 19 |
| D9 (V[1)]) | 2[g)] | —[h)] | —[h)] | 5 | 1 | 26 |

[a)]$M_5$: nonionic monomers;
[b)]$S_2$: nonionic emulsifiers;
[c)]$M_3$: Ionic monomers;
[d)]$S_1$: Ionic emulsifiers;
[e)]Stated percentages are based on the total amount of the monomers used for the production of the dispersion;
[f)]Comparative example;
[g)]Comparative dispersion;
[h)]not specified.

II.4 Solvent- and Plasticizer-free Emulsion Paint Having a PVC of 75.6%; Formulation (IV) (Comparative Examples E1 and E9, Examples E2 to E5)

The following components are initially introduced into a vessel:

| | |
|---|---|
| 248.0 g | of water |
| 3.0 g | of rheology assistant methylhydroxyethylcellulose having a viscosity of 30 Pa · s (determined as a 1.9% strength solution in water at 25° C.); Tylose ® MH 30000 YP2; Clariant GmbH, Frankfurt |
| 13.0 g | of a 10% strength by weight solution of a sodium polyphosphate in water, Calgon ®; BK Guilini Chemie GmbH & Co. OHG |
| 3.0 g | of dispersant Lopon ® 894; BK Guilini Chemie GmbH & Co. OHG |
| 4.0 g | of antifoam Agitan ® VP 315; Münzing-Chemie GmbH, Heilbronn |
| 2.0 g | of sodium hydroxide solution (10%) |
| 4.0 g | of preservative Mergal ® K 9 N; Troy Chemie GmbH, Seelze |
| 5.0 g | of rheology additive: 10% strength by weight aqueous solution of a hectorite; Hectone H; G.M. Langer & Co. GmbH, Ritterhude |

The following are added to these with stirring:

| | |
|---|---|
| 100.0 g | of mica, 50 µm mica MU-N 85; Ziegler & Co. GmbH, Wunsiedel |
| 100.0 g | of calcium carbonate, precipitated, 0.3 µm Socal P2; Deutsche Solvay GmbH, Solingen |
| 25.0 g | of aluminum silicate, 2.5 µm kaolin china grade B; Imerys, St. Austell, Cornwall, England |
| 90.0 g | of calcium carbonate, calcite 2 µm, calcite having a mean particle size of 2 µm; Omya Carb 2 GU; Omya GmbH, Cologne |
| 90.0 g | of calcium carbonate, calcite 5 µm, calcite having a mean particle size of 5 µm; Omya Carb 5 GU; Omya GmbH, Cologne |
| 185.0 g | of titanium dioxide pigment Kronos ® 2160; Kronos Titan GmbH, Leverkusen |

The components are mixed for 20 minutes in a high-speed disperser. The following components are then added with stirring:

| | |
|---|---|
| 130.0 g | of polymer dispersion A from I.) or V2 (53.0% strength by weight) |

The PVC of the solvent- and plasticizer-free interior paint is 75.6%. The results of the testing of the performance characteristics are summarized in table 7.

Examples E2 to E5 according to the invention make it clear that, compared with a heterogeneous vinyl acetate/ethene copolymer dispersion A1 known from the prior art and a commercial, homogeneous vinyl acetate/ethene copolymer dispersion V2, the dispersions A2 to A5 according to the invention exhibit substantially improved performance characteristics in solvent- and plasticizer-free binder-rich coating systems (cf. tables 3 to 6) and moreover permit the preparation of solvent- and plasticizer-free interior paints (PVC=75.6%) which are comparable in their performance profiles to heterogeneous vinyl acetate/ethene copolymer dispersions known from the prior art (cf. example E1).

TABLE 7

Testing of the performance characteristics of the formulation IV

| Emulsion paint | Dispersion | Stabilization of the dispersion Σ $M_5$[a)] and $S_2$[b)] [%][e)] | Σ $M_3$[c)] and $S_1$[d)] [%][e)] | Blocking resistance | Abrasion resistance |
|---|---|---|---|---|---|
| E1 (V[1)]) | A1 (V1[g)]) | 3 | 0.7 | 0 | 11 |
| E2 | A2 | 0 | 2.6 | 0 | 10 |
| E3 | A3 | 0 | 2.6 | 0 | 10 |
| E4 | A4 | 0 | 2.6 | 0 | 11 |
| E5 | A5 | 0 | 2.6 | 0 | 11 |
| E6 | A6 | 0 | 2.6 | 0 | 7 |
| E7 | A7 | 0 | 2.6 | 0 | 8 |
| E8 | A8 | 0 | 2.6 | 0 | 8 |
| E9 (V[1)]) | v2[g)] | —[h)] | —[h)] | 0 | 8 |

[a)]$M_5$: nonionic monomers;
[b)]$S_2$: nonionic emulsifiers;
[c)]$M_3$: Ionic monomers;
[d)]$S_1$: Ionic emulsifiers;
[e)]Stated percentages are based on the total amount of the monomers used for the production of the dispersion;
[f)]Comparative example;
[g)]Comparative dispersion;
[h)]not specified.

In addition, examples E6 to E8 according to the invention show that, over and above their advantageous properties in solvent- and plasticizer-free binder-rich coating systems (cf. tables 3 to 6), the heterogeneous dispersions A6 to A8 according to the invention which are predominantly stabilized by ionic components and contain silanes in the form of copolymerized units can be used for the preparation of solvent- and plasticizer-free interior paints which have improved abrasion resistances compared with an interior paint which was formulated using a heterogeneous vinyl ester/ethene dispersion corresponding to the prior art (E1). Said abrasion resistances correspond to the abrasion resistances as can be achieved with a commercial homogeneous vinyl ester/ethene dispersion (E9).

III. Determination of the Performance Characteristics

III.1.1 Surface Tack of Dried Dispersion Films

For testing the surface tack of dried dispersion films produced from the dispersion A, glass plates (5 cm×20 cm) are coated with the corresponding dispersions with the aid of a box-type doctor blade (wet layer thickness: 200 μm). After drying for 24 hours under standard conditions (23° C., 50% relative humidity), the surface tack is carried out with the aid of a Polyken Probe Tacktester (TMI). For this purpose, the ram of the tack tester is pressed with a contact pressure of $5.1 \times 10^4$ N/m$^2$ for 20 seconds onto the dispersion film to be investigated and, after this time, pulled perpendicularly away from the surface at a speed of 1 cm/sec. The force which is required to separate the ram from the surface of the dispersion film is determined.

Evaluation:

Rating 1: 0 N/m$^2$; rating 2: $0.01 \times 10^4$ to $2.5 \times 10^4$ N/m$^2$; rating 3: $2.51 \times 10^4$ to $5.1 \times 10^4$ N/m$^2$; rating 4: $5.11 \times 10^4$ to $7.6 \times 10^4$ N/m$^2$; rating 5: $7.61 \times 10^4$ to $10.20 \times 10^4$ N/m$^2$; rating 6: $>10.20 \times 10^4$ N/m$^2$.

The surface tack thus increases with increasing rating.

III.2. Blocking Resistance of Dried, Pigment-containing Coatings

For testing the blocking resistance of the formulations I, hiding power cards from BYK Malinckrodt or Morest are coated with the corresponding emulsion paints (wet layer thickness: 200 μm). After drying for 24 hours at 50° C., two coated cards are placed with their coated side one on top of the other and loaded with $0.78 \times 10^4$ N/m$^2$ for 0.5 hour at room temperature. The force required for separating the coated cards from one another again is then determined.

For testing the blocking resistance of the formulations II, III and IV, hiding power cards from BYK Malinckrodt or Morest are coated with the corresponding emulsion paint (wet layer thickness: 200 μm). After drying for 24 hours under standard conditions (23° C., 50% relative humidity), two coated cards are placed with their coated side one on top of the other and loaded with $3.1 \times 10^4$ N/m$^2$ for 0.5 hour at room temperature. The force required for separating the coated cards from one another again is then determined.

Evaluation of the blocking resistance of the formulations I to III:

Rating 0: 0 N/m$^2$; rating 1: $0.1 \times 10^4$ to $0.8 \times 10^4$ N/m$^2$; rating 2: $0.81 \times 10^4$ to $1.6 \times 10^4$ N/m$^2$; rating 3: $1.61 \times 10^4$ to $2.4 \times 10^4$ N/m$^2$; rating 4: $2.41 \times 10^4$ to $3.20 \times 10^4$ N/m$^2$; rating 5: $>3.20 \times 10^4$ N/m$^2$.

The blocking resistance thus decreases with increasing rating.

III.3. Gloss of Dried, Pigmented Coatings

For testing the gloss, hiding power cards from BYK Malinckrodt or Morest are coated with the corresponding emulsion paint (wet layer thickness: 200 μm). After. drying for 24 hours under standard conditions (23° C., 50% relative humidity), the gloss of these coatings is determined using a laboratory reflectometer RL (reflectometer measuring head RL) from Dr. Bruno Lange GmbH at angles of 20°, 60° and 85°.

The gloss properties increase with increasing reflectometer values.

III.4. Abrasion Resistance of Dried, Pigmented Coatings

The abrasion resistances for the paint formulations II, III and IV are determined according to European Standard 13300 by means of a model 494 abrasion tester from Erichsen with adapter set for abrasion tests according to ISO 11998. Abrasion pads (3M Scotch Brite Handpad 7448, type S ultra fine) having dimensions of 39×90 mm serve as a standardized abrasion medium. The emulsion paints are applied to Leneta films using a film drawing apparatus model 509/1 from Erichsen with a doctor blade having a gap height of 200 μm. The films are then dried under standard conditions (23° C., 50% relative humidity) in a conditioned chamber for 28 days. The dry layer thickness is about 130 μm (formulation II), 120 μm (formulation III) or 160 μm (formulation IV). Test specimens having a length of 430 mm and a width of at least 80 mm are cut from the coated Leneta film and weighed. After the test specimens have been clamped in the abrasion machine, the wash liquid (0.25% strength by weight solution of sodium dodecylbenzenesulfonate in distilled water) is applied to the surface of the paint film with the aid of a soft brush. Thereafter, the abrasive pad is impregnated with the wash liquid until the pad weight, including wash liquid, is from 3.5 to 4.5 g. After the wash liquid applied by means of the brush has acted for 60 seconds, the paint film is subjected to an abrasive load with the unprinted side of the impregnated abrasive pad for 200 abrasion cycles.

Immediately after the end of the 200 abrasion cycles, the test specimen is cleaned with a gentle water jet to remove abraded particles and is dried under standard conditions until the weight is constant. The weight loss is determined on an analytical balance and is shown as a weight loss per unit area, which can be determined on the basis of the abraded area of 148 cm$^2$, which is obtained from the pad width of 3.9 cm multiplied by the length of 38 cm covered. Evaluation of the weight loss per unit area:

Rating 0: 0 mg/cm$^2$; rating 1: 0.01 to 1.0 mg/cm$^2$; rating 2: 1.01 to 2.0 mg/cm$^2$; rating 3: 2.01 to 3.0 mg/cm$^2$; rating 4: 3.01 to 4.0 mg/cm$^2$; rating 5: 4.01 to 5.0 mg/cm$^2$; rating 6: 5.01 to 6.0 mg/cm$^2$; rating 7: 6.01 to 7.0 mg/cm$^2$; rating 8: 7.01 to 8.0 mg/cm$^2$; rating 9: 8.01 to 9.0 mg/cm$^2$; rating 10: 9.01 to 10.0 mg/cm$^2$; rating 11: 10.01 to 11.0 mg/cm$^2$; rating 12: 11.01 to 12.0 mg/cm$^2$; rating 13: >12.0 mg/cm$^2$.

The abrasion resistance of the coatings thus decreases with increasing rating.

The invention claimed is:

1. An aqueous plastic material dispersion based on a vinyl ester copolymer P obtained by multistage emulsion polymerization with a solid content of up to 80% by weight and a minimum film formation temperature below 20° C., which is substantially stabilized by ionic components, the vinyl ester copolymer P comprising at least one homo- or copolymer A and at least one homo- or copolymer B, and the homo- or copolymer A having a glass transition temperature of 0 to 20° C. and the homo- or copolymer B having a glass transition temperature of 20 to 50° C., provided that the glass transition temperatures of the two homo- or copolymers A and B differ by at least 10 K, the sum of the amounts of the homo- or copolymers A and B in the vinyl ester copolymer P being at least 50% by weight, based on the copolymer P, the weight ratio of homo- or copolymer A to homo- or copolymer B being 95/5 to 5/95 and the homo- or copolymers A and B, independently of one another, containing in the form of copolymerized units a) from 50 to 100% by weight of at least one vinyl ester of carboxylic acids of 1 to 18 carbon atoms (M1) and b) from 0 to 25% by weight of at least one monoethylenically unsaturated, optionally halogen-substituted hydrocarbon of 2 to 4 carbon atoms (M2), based on the total mass of the monomers used for the preparation of the respective homo- or copolymer A and B, wherein it comprises, based on the total mass of the monomers used for the preparation of the vinyl ester copolymer P, from 0 to 10% by weight of at least one ethylenically unsaturated, ionic monomer (M3) and from 0 to 5% by weight of ionic emulsifiers (S1), the total mass of ethylenically unsaturated, ionic monomers (M3) and ionic emulsifiers (S1) being at least 2%.by weight.

2. The plastic material dispersion of claim 1, wherein it has a solids content of from of 20 to 80% by weight.

3. The plastic material dispersion of claim 1 wherein the sum of the amounts of the homo- or copolymers A and B in the vinyl ester copolymer P is from 75 to 100% by weight, based on the total mass of the copolymer P.

4. The plastic dispersion of claim 1 wherein it has a pH in the range of 2 to 9.

5. The plastic material dispersion of claim 1 wherein the homo- or copolymers A and/or B contain, as vinyl esters of carboxylic acids of 1 to 18 carbon atoms (M1) incorporated in a form selected from the group consisting of polymerized units, vinyl esters of carboxylic acids of 1 to 8 carbon atoms, vinyl esters of saturated, branched, monocarboxylic acids of 9, 10 or 11 carbon atoms in the acid, vinyl esters of relatively long-chain, saturated and unsaturated fatty acids, vinyl esters of benzoic acid and of p-tert-butylbenzoic acid and mixtures thereof.

6. The plastic material dispersion of claim 1 wherein the homo- or copolymers A and/or B contain vinyl acetate as vinyl esters of carboxylic acids of 1 to 18 carbon atoms (M1) incorporated in the form of polymerized units.

7. The plastic material dispersion of claim 1 wherein the copolymers A and/or B contain ethene as monoethylenically unsaturated hydrocarbons of 2 to 4 carbon atoms (M2) incorporated in the form of copolymerized units.

8. The plastic material dispersion of claim 1 wherein the amount of monoethylenically unsaturated hydrocarbons of 2 to 4 carbon atoms (M2) in the vinyl ester copolymer P is less than 20% by weight, based on the total mass of the monomers used for the preparation of the vinyl ester copolymer P.

9. The plastic material dispersion of claim 1 wherein the homo- or copolymers A and/or B contain, as ethylenically unsaturated, ionic monomers (M3) incorporated in the form of copolymerized units, unsaturated monocarboxylic acids, unsaturated dicarboxylic acids or the monoesters thereof with alkanols of 1 to 12 carbon atoms, unsaturated sulfonic acids and/or unsaturated phosphonic acids.

10. The plastic material dispersion of claim 1 wherein the vinyl ester copolymer P contains, incorporated as copolymerized units, up to 5% by weight, based on the total mass of the monomers used for the preparation of the vinyl ester copolymer P, at least one unsaturated, copolymerizable organic silicon compound (M4).

11. The plastic material dispersion of claim 10 wherein monomers containing siloxane groups and of the formula $RSi(CH_3)_{0-2}(OR^1)_{3-1}$, in which R has the meaning $CH_2=CR^2-(CH_2)_{0-1}$ or $CH_2=CR^2CO_2-(CH_2)_{1-3}$, $R^1$ is an unsubstituted or substituted alkyl of 3 to 12 carbon atoms, which may be interrupted by an ether group, and $R^2$ is —H or —$CH_3$, are used as unsaturated, copolymerizable organosilicon compounds (M4).

12. The plastic material dispersion of claim 1 wherein the vinyl ester copolymer P contains, incorporated in the form of copolymerzied units, up to 5% by weight of ethylenically unsaturated, nonionic monomers (M5), based on the total mass of the monomers used for the preparation of the vinyl ester copolymer P.

13. The plastic material dispersion of claim 1 wherein the vinyl ester copolymers P contain, incorporated in the form of copolymerized units, up to 30% by weight of at least one further, ethylenically unsaturated monomer (M6), based on the total mass of the monomers used for the preparation of the vinyl ester copolymer P.

14. The plastic material dispersion of claim 1 wherein it contains from 0.1 to 4% by weight of ionic emulsifiers (S1), based on the total mass of the monomers used for the preparation of the vinyl ester copolymer P.

15. The plastic material dispersion as of claim 1 wherein it contains anionic emulsifiers as ionic emulsifiers (S1).

16. The plastic material dispersion of claim 15, wherein it contains alkali metal and ammonium salts of alkylsulfates, alkylphosphonates, sulfuric monoesters or phosphoric mono- and diesters of ethoxylated alkanols and ethoxylated alkyiphenols, of alkanesulfonic acids and alkylarylsulfonic acids, and/or compounds of the formula

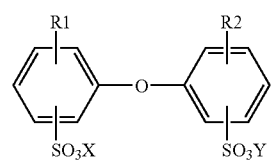

(I)

in which $R^1$ and $R^2$ are hydrogen or alkyl of 4 to 24 carbon atoms and are not both simultaneously hydrogen and X and Y are independently alkali metal ions or ammonium ions, as anionic emulsifiers.

17. The plastic material dispersion of claim 1 wherein it contains nonionic emulsifiers (S2).

18. The plastic material dispersion of claim 12 wherein the ratio of the total amount of ionic components (M3) and (S1) to the total amount of nonionic components (M5) and (S2) used does not fall below the value 1 .

19. A method for producing a plastic material dispersion preparing first the homo- or copolymer B by aqueous free radical emulsion polymerization and then preparing the homo- or copolymer A in the aqueous dispersion of the homo- or copolymer B.

20. An aqueous formulation for coating substrates, comprising a plastic material dispersion of claim 1.

21. A pigment-containing, aqueous formulation comprising a plastic material dispersion of claim 1.

22. An emulsion paint, comprising a plastic material dispersion of claim 1.

23. A food coating, comprising a plastic material dispersion of claim 1.

24. A paper coating slip, comprising a plastic material dispersion of claim 1.

25. In a process for coating substrates with an aqueous formulation, the improvement comprising adding the plastic material dispersion of claim 1 to the aqueous formulation.

26. In a process for coating substrates with pigment-containing aqueous formulations, the improvement comprising adding the plastic material dispersion of claim 1 to the formulations as a binder.

27. In a process for coating substrates with an emulsion paint, the improvement comprising adding the plastic material dispersion of claim 1 to the emulsion paint as a binder.

28. In a process for preparing at least one member of the group consisting of synthetic resin-bound renders, tile adhesives, coating materials, joint sealing compounds, sealing compounds and paper coating slips, the improvement comprising adding the plastic material dispersion of claim 1 as a binder.

* * * * *